US010293257B2

(12) United States Patent
Gupta et al.

(10) Patent No.: US 10,293,257 B2
(45) Date of Patent: *May 21, 2019

(54) SYSTEMS AND METHODS FOR PROGRAMMATICALLY GENERATING NON-STEREOSCOPIC IMAGES FOR PRESENTATION AND 3D VIEWING IN A PHYSICAL GAMING AND ENTERTAINMENT SUITE

(71) Applicant: Golfstream Inc., Los Angeles, CA (US)

(72) Inventors: Sameer M. Gupta, Pasadena, CA (US); Adnan I. Ansar, Tujunga, CA (US); Scott A. Basinger, Arcadia, CA (US); Andres Castano, La Crescenta, CA (US)

(73) Assignee: GOLFSTREAM INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,449

(22) Filed: Nov. 8, 2017

(65) Prior Publication Data

US 2018/0065041 A1 Mar. 8, 2018
US 2018/0296918 A9 Oct. 18, 2018

Related U.S. Application Data

(63) Continuation of application No. 15/078,998, filed on Mar. 23, 2016, now Pat. No. 9,849,385, and a
(Continued)

(51) Int. Cl.
*A63F 13/5255* (2014.01)
*A63B 69/36* (2006.01)
*G06T 15/20* (2011.01)

(52) U.S. Cl.
CPC .......... *A63F 13/5255* (2014.09); *A63B 69/36* (2013.01); *G06T 15/20* (2013.01)

(58) Field of Classification Search
CPC ...... A63F 13/5255; A63B 69/36; G06T 15/20
See application file for complete search history.

(56) References Cited

U.S. PATENT DOCUMENTS

| 4,005,870 A | * | 2/1977 | Grace | .................... | A63B 69/36 |
| | | | | | 434/252 |
| 4,015,342 A | * | 4/1977 | Masselle | ................ | G09B 9/304 |
| | | | | | 352/132 |

(Continued)

FOREIGN PATENT DOCUMENTS

KR      100864641 B1    10/2008

OTHER PUBLICATIONS

Golfstream Inc., International Search Report and Written Opinion, PCTUS2016/023842, dated May 27, 2016, 16 pgs.
(Continued)

*Primary Examiner* — Corbett B Coburn
(74) *Attorney, Agent, or Firm* — Morgan, Lewis & Bockius LLP

(57) ABSTRACT

Systems and methods for programmatically generating anamorphic images for presentation in a physical gaming suite (e.g., anamorphic images that are viewable without requiring any external wearable device) are disclosed herein. An example method includes: monitoring, using data received from one or more sensors, viewing characteristics associated with one or more game participants in the physical gaming suite. The method also includes: determining a viewpoint that is based on at least some of the monitored viewing characteristics. The method further includes: based on the viewpoint, generating a anamorphic image for presentation within the physical gaming suite. The method additional includes: providing, to the one or more display
(Continued)

devices, data to present the anamorphic image within the physical gaming suite (e.g., near at least one physical object that is included within the physical gaming suite).

20 Claims, 15 Drawing Sheets

Related U.S. Application Data continuation-in-part of application No. 14/880,114, filed on Oct. 9, 2015, now Pat. No. 9,821,220.

(60) Provisional application No. 62/137,122, filed on Mar. 23, 2015, provisional application No. 62/062,111, filed on Oct. 9, 2014.

(56) References Cited

U.S. PATENT DOCUMENTS

| | | | |
|---|---|---|---|
| 5,527,041 A | 6/1996 | Terry, III et al. | |
| 5,590,249 A * | 12/1996 | Hanaoka | G06T 15/405 345/422 |
| 6,010,403 A * | 1/2000 | Adam | A63F 13/08 434/66 |
| 6,071,202 A * | 6/2000 | Densberger | A63B 69/3614 362/259 |
| 6,213,887 B1 | 4/2001 | Carney | |
| 6,774,932 B1 | 8/2004 | Ewing et al. | |
| 7,614,748 B2 * | 11/2009 | Nayar | H04N 13/0242 219/121.69 |
| 8,202,148 B2 | 6/2012 | Young | |
| 8,388,146 B2 * | 3/2013 | Goran | H04N 9/3173 348/53 |
| 8,616,988 B1 | 12/2013 | Coffman | |
| 2002/0024517 A1 * | 2/2002 | Yamaguchi | A63F 13/10 345/424 |
| 2002/0049101 A1 | 4/2002 | Robinson | |
| 2002/0113867 A1 * | 8/2002 | Takigawa | G02B 27/2228 348/51 |
| 2004/0005934 A1 | 1/2004 | Battaglia | |
| 2004/0132555 A1 | 7/2004 | Forrest | |
| 2004/0169836 A1 | 9/2004 | Wegmann | |
| 2005/0101415 A1 * | 5/2005 | Sweeney | A63B 24/0021 473/407 |
| 2006/0028489 A1 * | 2/2006 | Uyttendaele | G06T 15/205 345/646 |
| 2006/0258473 A1 | 11/2006 | Khananayev | |
| 2006/0262969 A1 * | 11/2006 | Matsumoto | G06K 9/34 382/131 |
| 2008/0021651 A1 | 1/2008 | Seeley et al. | |
| 2010/0081520 A1 * | 4/2010 | Peterson | A63B 24/0021 473/409 |
| 2010/0103516 A1 * | 4/2010 | McKnight | A63F 13/06 359/465 |
| 2010/0177403 A1 | 7/2010 | Dolgoff | |
| 2010/0184496 A1 * | 7/2010 | Nicora | A63B 24/0021 463/5 |
| 2010/0231583 A1 * | 9/2010 | Furukawa | G01B 11/24 345/419 |
| 2011/0118040 A1 * | 5/2011 | Ashby | A63B 69/3623 473/156 |
| 2012/0155744 A1 * | 6/2012 | Kennedy | A63F 13/10 382/154 |
| 2012/0214590 A1 | 8/2012 | Newhouse et al. | |
| 2013/0072302 A1 * | 3/2013 | Suzuta | A63F 13/04 463/36 |
| 2013/0082993 A1 * | 4/2013 | Kim | G09G 5/10 345/207 |
| 2013/0085018 A1 * | 4/2013 | Jensen | A63B 57/00 473/404 |
| 2013/0215101 A1 * | 8/2013 | Duan | G09G 5/32 345/419 |
| 2014/0004969 A1 | 1/2014 | Jang et al. | |
| 2014/0073445 A1 | 3/2014 | Flammer | |
| 2014/0313190 A1 * | 10/2014 | Vesely | G06T 15/20 345/419 |
| 2015/0363964 A1 * | 12/2015 | Chavez | G06F 3/04815 345/419 |
| 2016/0019434 A1 * | 1/2016 | Caldwell | G06K 9/4671 345/474 |
| 2016/0158640 A1 * | 6/2016 | Gupta | A63F 13/213 463/3 |
| 2016/0217348 A1 * | 7/2016 | Cho | G06T 1/0007 |
| 2016/0371884 A1 * | 12/2016 | Benko | G06T 19/006 |
| 2017/0161561 A1 | 6/2017 | Marty et al. | |
| 2017/0223312 A1 * | 8/2017 | McNelley | H04N 7/147 |

OTHER PUBLICATIONS

Golfstream Inc., International Preliminary Report on Patentability, PCTUS2016/023842, dated Sep. 26, 2017, 9 pgs.
Golfstream Inc., International Search Report and Written Opinion, PCTUS2015/055018, dated Jan. 8, 2016, 10 pgs.
Golfstream Inc., International Preliminary Report on Patentability, PCTUS2015/055018, dated Apr. 11, 2017, 7 pgs.
Golfstream_Communication Pursuant to Rules 161(1) and 162, EP15784534.8, dated May 29, 2017, 2 pgs.

* cited by examiner

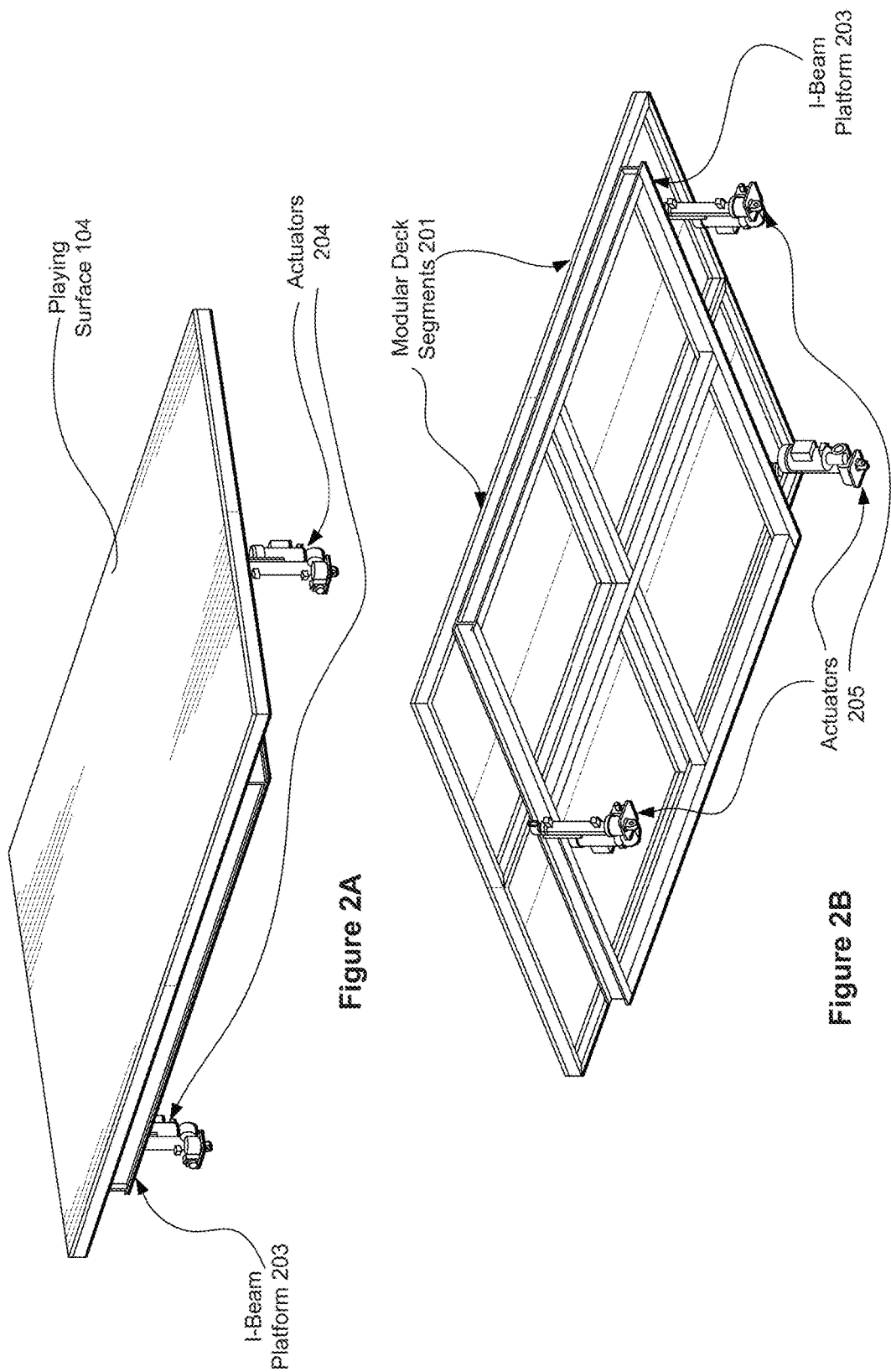

SYSTEMS AND METHODS FOR PROGRAMMATICALLY GENERATING NON-STEREOSCOPIC IMAGES FOR PRESENTATION AND 3D VIEWING IN A PHYSICAL GAMING AND ENTERTAINMENT SUITE

RELATED APPLICATIONS

This application is a continuation of U.S. patent application Ser. No. 15/078,998, filed Mar. 23, 2016, which claims priority to U.S. Provisional Patent Application No. 62/137,122, filed Mar. 23, 2015, both of which are hereby incorporated by reference in its entirety.

This application is a continuation-in-part of U.S. patent application Ser. No. 14/880,114, filed Oct. 9, 2015, which claims priority from U.S. Provisional Patent Application No. 62/062,111, filed Oct. 9, 2014, each of which is hereby incorporated by reference in its entirety.

TECHNICAL FIELD

The embodiments described herein relate to programmatically generating anamorphic images (e.g., based on user-specific viewpoints, topography of a surface, ambient light levels, and/or other aspects that impact ability to perceive a 3D effect) and, in particular, to programmatically generating anamorphic images for presentation and 3D viewing in a physical gaming and entertainment suite (e.g., for viewing by at least two users without requiring any wearable device, such as glasses, a head-mounted display, or the like).

BACKGROUND

Some 3D imaging techniques require users to wear a device (e.g., eyeglasses, a head-mounted display, and the like) in order to view and appreciate rendered three-dimensional images. Many of these techniques cause users to experience feelings of sickness and general discomfort while wearing the device and viewing the rendered three-dimensional images.

Therefore, there is a pressing need for 3D imaging techniques that do not require users to wear a device in order to view and appreciate three-dimensional images and that also do not cause users to experience sickness and/or discomfort while viewing the three-dimensional images. These needs are particularly acute for gaming and entertainment systems in which multiple users are actively moving around and, thus, 3D images must adapt and respond to user movement as well as to various gaming events.

SUMMARY

Accordingly, there is a need for 3D imaging techniques that address the above drawbacks and, in particular, for 3D imaging techniques that are well-suited for active gaming and entertainment environments. Some embodiments disclosed herein provide systems and methods for programmatically generating anamorphic images for presentation in a physical gaming and entertainment suite (e.g., for 3D viewing within a physical gaming and entertainment suite that is used for simulating golf). In some embodiments, one or more sensors (e.g., visual sensors, such as cameras positioned within a physical gaming and entertainment suite) send data to a computing device (e.g., through a network) that uses the data to monitor viewing characteristics associated with one or more game participants in the physical gaming and entertainment suite (e.g., one or more golfers). The computing device determines a viewpoint (e.g., an average viewpoint based on current viewpoints for two or more of the game participants or a predicted viewpoint that estimates an average viewpoint into the future, such as two or three seconds into the future) that is based on at least some of the monitored viewing characteristics. Based on the viewpoint, the computing device generates an anamorphic image for presentation within the physical gaming and entertainment suite. The computing device also provides to one or more display devices (e.g., one or more projectors) data to present the anamorphic image near at least one physical object (e.g., a surface of the physical gaming and entertainment suite or an object within the physical gaming and entertainment suite, such as a chair, a putter, etc.). In some embodiments, once the anamorphic image is presented, at least two of the game participants are able to view the anamorphic image in 3D and without having to wear any external device (such as glasses or headgear or the like). In this way, some embodiments provide game participant with a 3D viewing experience that does not require any wearable device.

Various references are made herein to a physical gaming suite (e.g., physical gaming suite 300, FIG. 3A) that includes a number of components that are used to monitor viewing characteristics for game participants and render anamorphic images for 3D viewing by the game participants. In some embodiments, the physical gaming suite is a physical gaming and entertainment suite that is used for simulating games (e.g., golf, snowboard, billiards, and the like) and is also used for presenting movies, historical tours, and other entertainment features that include use of anamorphic images that are presented within a physical gaming and entertainment suite for 3D viewing.

In some embodiments, generating the anamorphic image for 3D viewing includes generating the anamorphic image based at least in part on both a determined viewpoint (e.g., a common/optimal/average viewpoint that is determined based on viewing characteristics associated with multiple game participants) and based on a current topography of a bottom surface within the physical gaming suite (e.g., a deformable or tilt-able surface, as described in reference to FIGS. 2A-2C). In some embodiments, at least three distinct inputs are utilized in order to generate the anamorphic image, including (i) the common viewpoint that represents a viewpoint that allows two or more game participants to view a 3D effect for the anamorphic image; (ii) a current topography of the bottom surface; and (iii) an intended viewing position for the 3D effect for the anamorphic image (e.g., a starting position within the physical gaming suite at which the 3D effect is intended to begin). Other inputs may also be utilized, including measured levels of ambient light (e.g., operations 530-534 of FIGS. 5A-5C below), gaming events (game participants moving around, striking golf balls, and the like, as discussed herein), and desired shadowing effects (e.g., additional shadow to add to the anamorphic image in order to improve perception of the 3D effect). Additional details regarding these inputs are provided throughout this description (e.g., in reference to FIGS. 5A-5C and FIG. 6).

While the sport of golf is used as the primary example herein, it should be appreciated that the sport, game, and/or entertainment simulation systems (and methods of use thereof) may be adapted and used for any other sport or game—particularly those that use a ball, such as golf, pool, billiards, etc., or entertainment purposes, such as viewing movies or interacting with content-rich textbooks.

In some embodiments, VR techniques that do not require wearable gear include volumetric imaging using a 3D medium to create light (e.g., voxels) within a limited space, holography, and autostereoscopic which displays stereoscopic images to user's eyes for the user to perceive a 3D view. In some embodiments, a system sends multiple images so that the user's eye position does not need to be known. In some alternative embodiments, a system tracks the user's eye movements to customize the display based on the user's position. In the latter embodiments, when the system displays the same scene to multiple user's, only the user whose eye movements are being tracked perceives a true 3D view. In some embodiments, the user's eyes position can be estimated based on other sensory input (body part position like head or shoulders) or game sequencing (user is told to stand, crouch, sit or lay down in a specific location, with user's height already known)

In some embodiments, the VR sports system disclosed herein comprises a programmatic projection mapping, display screens, deformable surfaces, changing target locations, and single or multi-person viewpoints (in a controlled simulated environment). In some embodiments, the VR sports system includes but not limited to surrounding sensory environmental and gaming technology such as multi-sensory inputs in various settings with feedback loops from systems such as immersive light fields, kinetic tracking, eye tracking, heat mapping, surface/floor deformation, material exchanges, olfactory sensors and output systems, weather/wind/water systems and camera systems.

(A1) In accordance with some embodiments, a method of programmatically generating anamorphic images for presentation in a physical gaming suite (e.g., gaming suite 300, FIG. 3A, that is part of sport simulation system 100, FIGS. 1A-1C) is performed at an electronic/computing device (e.g., system controller 114, FIG. 1A). The computing device is in communication with one or more sensors (e.g., one or more visual sensors, such as one or more cameras 103, FIG. 1A) and one or more display devices (e.g., one or more projectors 105, FIG. 1A). In some embodiments, the one or more sensors include one or more visual sensors and one or more proximity sensors and/or other locating-sensing sensors (such as heat sensors). The method includes: monitoring, using data received from the one or more visual sensors, viewing characteristics (e.g., eye gaze, head position, current standing/sitting location within the gaming suite) associated with one or more game participants in the physical gaming suite. The method also includes: determining a viewpoint that is based on at least some of the monitored viewing characteristics. Based on the viewpoint, the method includes: generating an anamorphic image for presentation within the physical gaming suite. The method further includes: providing, to the one or more display devices, data to present the anamorphic image near (e.g., or over, on, or on top of) at least one physical object (e.g., one or more surfaces within the physical gaming suite, such as a bottom surface and a back surface perpendicular to the bottom surface, a chair, a hula hoop, or any other object or surface within the suite) that is included within the gaming suite.

(A2) In accordance with some embodiments of the method of A1, the one or more game participants are not wearing any external wearable device, and the anamorphic image appears, to at least two of the one or more game participants without requiring use of any external wearable device, to have visual depth (i.e., no headgear is worn to experience and appreciate the 3D effect).

(A3) In accordance with some embodiments of the method of any one of A1-A2, the anamorphic image is not a stereoscopic image.

(A4) In accordance with some embodiments of the method of any one of A1-A3, providing the data to present the anamorphic image includes providing a first portion of the data to a first display device and providing a second portion of the data to a second display device that is distinct from the first display device.

(A5) In accordance with some embodiments of the method of A4, the first portion corresponds to data used to render the anamorphic image (e.g., for display within the physical gaming suite by the first display device) and the second portion corresponds to data used to render a shadow effect proximate to the anamorphic image (e.g., for display within the physical gaming suite by the second display device) (i.e., the shadow effect is used to enhance the 3D effect produced by the display of the anamorphic image).

(A6) In accordance with some embodiments of the method of any one of A1-A5, generating the anamorphic image includes generating the anamorphic image using one or more anamorphic techniques.

(A7) In accordance with some embodiments of the method of any one of A1-A6, the method further includes: detecting, using the one or more visual sensors, movement (e.g., the detected movement corresponds to a change in one or more of the viewing characteristics) of a first game participant of the one or more game participants within the physical gaming suite. In response to detecting the movement, the method includes: determining an updated viewpoint. Based on the updated viewpoint, the method includes: generating a second anamorphic image for presentation within the physical gaming suite. The method further includes providing, to the one or more display devices, data to present the second anamorphic image near at least one physical object that is included within the gaming suite.

(A8) In accordance with some embodiments of the method of any one of A1-A7, the anamorphic image appears with different visual characteristics to at least two of the game participants.

(A9) In accordance with some embodiments of the method of any one of A1-A8, the viewpoint is determined based at least in part on viewing characteristics associated with an active game participant of the one or more game participants, and the anamorphic image is generated in response to an input from the active game participant.

(A10) In accordance with some embodiments of the method of A9, the input corresponds to the active game participant striking a golf ball. For example, the active game participant putts a golf ball.

(A11) In accordance with some embodiments of the method of A10, the at least one physical object is the golf ball.

(A12) In accordance with some embodiments of the method of any one of A1-A11, the method includes: generating a second anamorphic image in accordance with a determination that an active game participant of the one or more gaming participants is about to strike a golf ball (e.g., anamorphic image is a distraction such as a gopher and the second anamorphic image is displayed after an active game participant hits a golf ball within a predetermined distance of the gopher). The method additionally includes: providing, to the one or more display devices, data to present the second anamorphic image.

(A13) In accordance with some embodiments of the method of any one of A1-A12, the method includes: detecting that a first game participant of the one or more game participants has interacted with a predefined portion of the anamorphic image. In response to detecting that the first game participant has interacted with the predefined portion of the anamorphic image, the method includes: providing, to the one or more display devices, data to present the anamorphic image at a new position within the physical gaming suite that is distinct from a first position at which the anamorphic image was presented during the first game participant's detected interactions.

(A14) In accordance with some embodiments of the method of any one of A1-A13, the method includes: generating a second anamorphic image based on viewing characteristics that are associated with a first game participant; and providing, to the one or more display devices, data to present the second anamorphic image such that the second anamorphic image is viewable by the first game participant and is not viewable by at least one other game participant of the one or more game participants.

(A15) In accordance with some embodiments of the method of any one of A1-A14, the at least one physical object is a bottom surface of the physical gaming suite, and providing the data includes providing data to present two or more component parts of the anamorphic image, such that a first component part is displayed on the bottom surface and a second component part is displayed on a back surface that is distinct from the bottom surface.

(A16) In accordance with some embodiments of the method of A15, the bottom surface of the physical gaming suite is a deformable surface, and generating the anamorphic image includes generating the anamorphic image based at least in part on both the viewpoint and based on a current topography of the bottom surface.

(A17) In accordance with some embodiments of the method of any one of A1-A16, determining the viewpoint includes (i) determining respective viewpoints for each of the one or more game participants based at least in part on the monitored viewing characteristics, and (ii) determining the viewpoint using a weighted average of respective viewpoints for two or more of the one or more game participants.

(A18) In accordance with some embodiments of the method of A17, the weighted average is biased towards a respective game participant that is closest to a position in the physical gaming suite at which the anamorphic image is to be provided.

(A19) In accordance with some embodiments of the method of A17, the method includes: in accordance with a determination that a respective viewpoint for a first game participant does not meet predefined viewpoint criteria, excluding the respective viewpoint from the weighted average of respective viewpoints.

(A20) In accordance with some embodiments of the method of A19, the method includes: in accordance with the determination that the respective viewpoint for the first game participant does not meet predefined viewpoint criteria, determining a second viewpoint for at least the first game participant and generate a second 3D object based on the second viewpoint; and providing, to the one or more display devices, data to present the second anamorphic image within the physical gaming suite.

(A21) In accordance with some embodiments of the method of any one of A1-A20, the method includes: storing, in the memory of the computing device, feedback from users regarding presentation of the anamorphic image within the physical gaming suite.

(A22) In accordance with some embodiments of the method of A21, the stored feedback is used to improve presentation of the anamorphic image within the physical gaming suite.

(A23) In accordance with some embodiments of the method of any one of A1-A22, the method includes: measuring, using a light-sensing device that is in communication with the computing device, ambient light levels within the physical gaming suite; and re-generating the anamorphic image in response to changes in the measured ambient light levels within the physical gaming suite.

(A24) In some embodiments, a system is provided for programmatically generating anamorphic images for presentation in a physical gaming suite, the system including: one or more display devices configured to present anamorphic images within the physical gaming suite based on data received from a computing device; one or more visual sensors configured to monitor viewing characteristics associated with one or more game participants in the physical gaming suite; and the computing device with one or more processors and memory. In some embodiments, the computing device is in communication with the one or more visual sensors and the one or more display devices, and the memory of the computing device stores one or more programs that, when executed by the one or more processors of the computing device, cause the computing device to: monitor, using data received from the one or more visual sensors, viewing characteristics associated with one or more game participants in the physical gaming suite; determine a viewpoint that is based on at least some of the monitored viewing characteristics; based on the viewpoint, generate a anamorphic image for presentation within the physical gaming suite; and provide, to the one or more display devices, data to present the anamorphic image near at least one physical object that is included within the gaming suite.

(A25) In some embodiments of the system of A24, the system is further configured to perform the method of any one of A2-A23 described above.

(A26) In some embodiments, a non-transitory computer-readable storage medium is provided. The non-transitory computer-readable storage medium stores one or more programs for programmatically generating anamorphic images for presentation in a physical gaming suite that, when executed by a computing device that is in communication with one or more visual sensors and one or more display devices, the computing device including one or more processors and memory, cause the computing device to: monitor, using data received from the one or more visual sensors that are in communication with the computing device, viewing characteristics associated with one or more game participants in the physical gaming suite; determine a viewpoint that is based on at least some of the monitored viewing characteristics; based on the viewpoint, generate a anamorphic image for presentation within the physical gaming suite; and provide, to one or more display devices that are in communication with the computing device, data to present the anamorphic image near at least one physical object that is included within the gaming suite.

(A27) In some embodiments of the non-transitory computer-readable storage medium of A26, the system is further configured to perform the method of any one of A2-A23 described above.

(A28) In accordance with some embodiments, a method of programmatically generating anamorphic images for presentation in a physical gaming suite (e.g., gaming suite 300, FIG. 3A, that is part of sport simulation system 100, FIGS. 1A-1C) is performed at an electronic/computing device (e.g., system controller 114, FIG. 1A). The computing device is in communication with one or more sensors (e.g., one or more visual sensors, such as one or more cameras 103, FIG. 1A) and one or more display devices (e.g., one or more projectors 105, FIG. 1A). In some embodiments, the one or more sensors include one or more visual sensors and one or more proximity sensors and/or other locating-sensing sensors (such as heat sensors). The method includes: monitoring, using data received from the one or more visual sensors, viewing characteristics (e.g., eye gaze, head position, current standing/sitting location within the gaming suite) associated with two or more game participants in the physical gaming suite. The method also includes: determining a viewpoint that is based on at least some of the monitored viewing characteristics that are associated with the two or more game participants. Based on the viewpoint, the method includes: generating an anamorphic image for presentation within the physical gaming suite. The method further includes: providing, to the one or more display devices, data to present the anamorphic image for 3D viewing by the at least two game participants within the physical gaming suite. In some embodiments, the anamorphic image is presented for 3D viewing near (e.g., or over, on, or on top of) at least one physical object (e.g., one or more surfaces within the physical gaming suite, such as a bottom surface and a back surface perpendicular to the bottom surface, a chair, a hula hoop, or any other object or surface within the suite) that is within the physical gaming suite.

(A29) In some embodiments of the method of A28, the method further includes performing the method of any one of A2-A23 described above.

(B1) In another aspect, a virtual reality system for simulating a game for one or more users, the system including: a deformable playing surface; at least one camera focused on a user to track at least one characteristic of a user; at least one projector or display screen for projecting real-time images for the user to view during the game; and a controller coupled to the deformable playing surface, the at least one camera, and the at least one projector, the controller having one or more processors and memory and configured to: (i) track the at least one characteristic during the game; (ii) change a topography of the deformable playing surface during the game based at least on the tracked at least one characteristic; and (iii) provide the real-time images to the at least one projector based at least on the tracked at least one characteristic and the current topography of the deformable playing surface.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 2A-2B are schematic diagrams of a first embodiment of a dynamic playing surface used in a sport simulation system, in accordance with some embodiments.

DESCRIPTION OF EMBODIMENTS

Figure 1A:
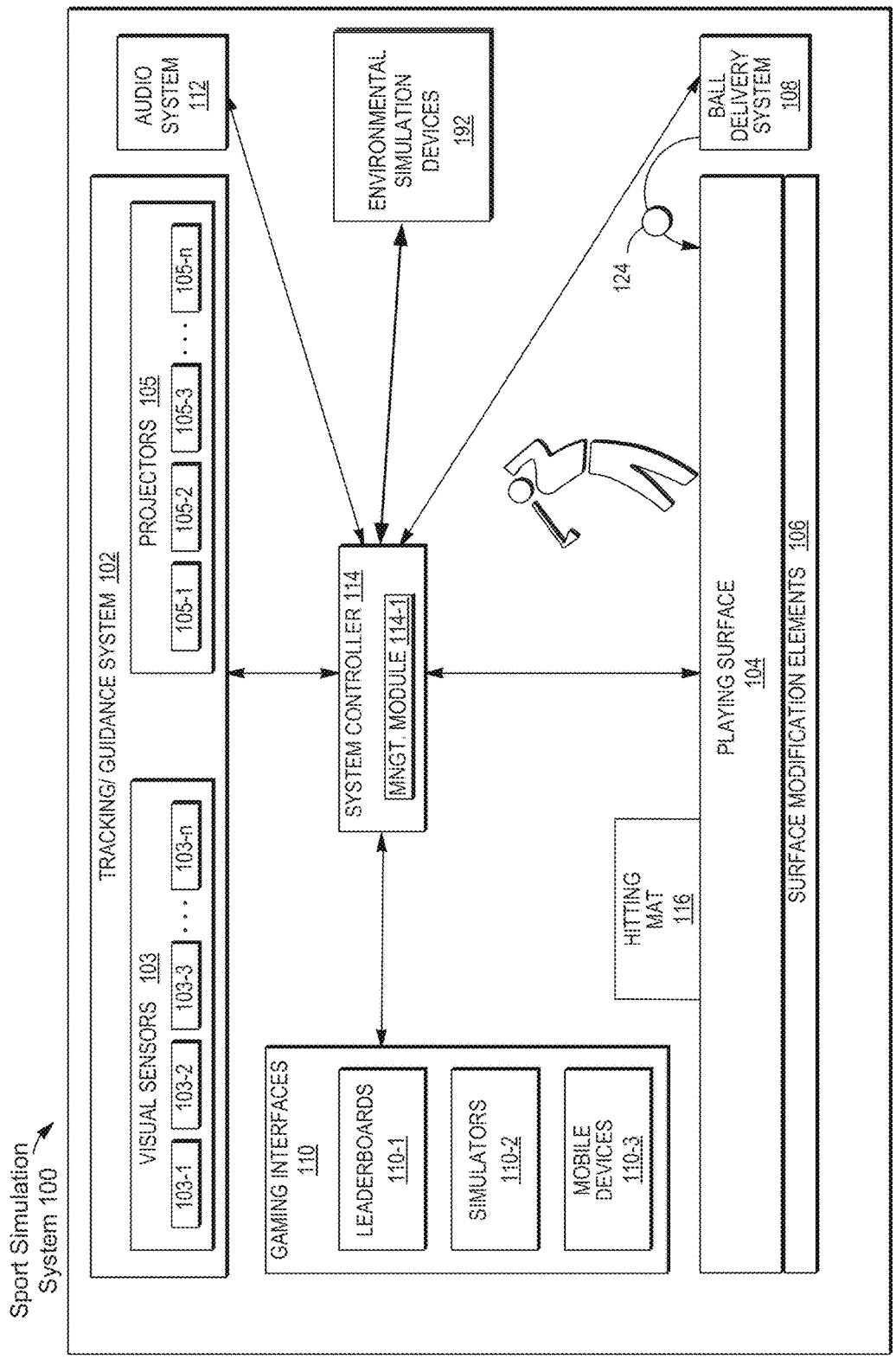
FIG. 1A is a block diagram of a sport simulation system in accordance with some embodiments.

As discussed above and in more detail below, there is a need for sport, gaming, and entertainment simulation systems that provide user-specific guidance, provide interactive 3D effects and features (without causing discomfort for users), and training using a dynamic playing surface. Disclosed herein are novel systems, games played using the systems, methods, and interfaces to address these needs.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Attention is now directed to FIG. 1A, showing a block diagram of a sport simulation system, in accordance with some embodiments. As shown in FIG. 1A, a sport simulation system 100 includes a tracking system 102, audio system 112, gaming interfaces 110, a playing surface 104, a ball delivery system 108, environmental simulation devices 192 for simulating various virtual reality conditions, and a system controller 114 that is coupled with each of the aforementioned components.

In some embodiments, the tracking/guidance system 102 includes visual sensors 103 (e.g., visual sensors 103-1, 103-2, 103-3 . . . 103-n) and projectors 105 (e.g., projectors 105-1, 105-2, 105-3 . . . 105-n, also referred to herein as display devices or display screens 105-1 through 105-n). In some embodiments, the projectors 105 are display screens that are positioned within a physical gaming suite (e.g., physical gaming suite 300, FIG. 3A). In some embodiments, the tracking/guidance system 102 is integrated, while in other embodiments, a separate tracking system and a separate guidance system is provided. For ease of explanation, references herein to tracking/guidance system 102 encompass embodiments in which the tracking and the guidance system are separate.

In some embodiments the visual sensors 103 and the projectors 105 are connected at various locations within the sports simulation system 100 (e.g., to the ceiling, to walls within the system, etc.) in order to provide enough angles to view all activities within the sports simulation system 100 and to project images at all angles within the sports simulation system 100 (e.g., including anamorphic images that are projected in 2D, such that one or more game participants are able to see the images in 3D).

In some embodiments, the tracking system 102 includes one or more high resolution digital cameras connected to a network of computers that perform complex computer-vision tracking of ball location, velocity, and associates each ball with a unique player. In some embodiments, the tracking system maintains a model of the playing field and state of each ball (e.g., locations of each ball on the playing surface 104) during game play. This allows for virtual or augmented reality features (see "Laser Crunch" game description below). In some embodiments, multiple cameras are used to attempt to keep the ball in a field of view at all times. Many players being on the green at the same time may occlude the view of one camera. In some embodiments, the tracking data from vision system is sent to a master system that will coordinate the data. In some embodiments, this master system will also have information about the topography of the green, location of the holes and the locations of virtual targets that are "drawn" by the master system.

In some embodiments, guidance system software is provided as a part of the tracking/guidance system 102, and this guidance system software uses classical mechanics (i.e. physics) to provide models for gravity, ballistics, and friction. As mentioned above, in some embodiments, the guidance system 102 has a model of the green topography. In some embodiments, using an optimizer/solver system allows the guidance system 102 to determine an optimal path, strike vector, and pendulum swing to help sink a putt on the playing surface 104. In some embodiments, guidance system software to determine these quantities solves numerous differential equations in near real-time to compute proper forces and trajectory for each putt. In some embodiments, a participant's progress (e.g., their skill level and improvement as they use the sport simulation system 100) is scored using the ball's trajectory and resting place relative to the hole and virtual targets (e.g., a more difficult made putt can be assigned more points than a simple or close-range made putt).

In some embodiments, the guidance system 102 also provides audio and visual aids that help guide and teach each participant how to putt. In some embodiments, the visual aids are provided using both digital projectors and 7-color (RGB) digital laser projectors that are programmed dynamically by the system controller 114 using a standard laser projector interface. In some embodiments, the audio component is supplied using a high fidelity public address system using digital audio samples that are stored and sequenced on a local server relative to the system controller 114. In some embodiments, the purpose of the visual aids is to provide a high contrast, easily visible, precise best fit line, ball target point (point to aim for on the playing surface 104, given a current topography of the playing surface 104), a putter back and forth motion required ("pendulum"), and a grid that identifies the contour of the green, which each depends on position of the ball with respect to the hole and the topography in between. In some embodiments, the visual component is established per putt/per player based upon image from camera imaging devices (e.g., cameras 103) that scan the entire green surface and those images are then used by the system controller 114 to determine how to render each of the aforementioned visual aids. In some embodiments, the visual system will also place concentric circles (e.g., concentric targets 270, FIG. 2C) that will have different points scale as you get closer to the hole and point values and locations/sizes of the concentric circles are determined based upon data from the cameras 103.

Figure 1B:
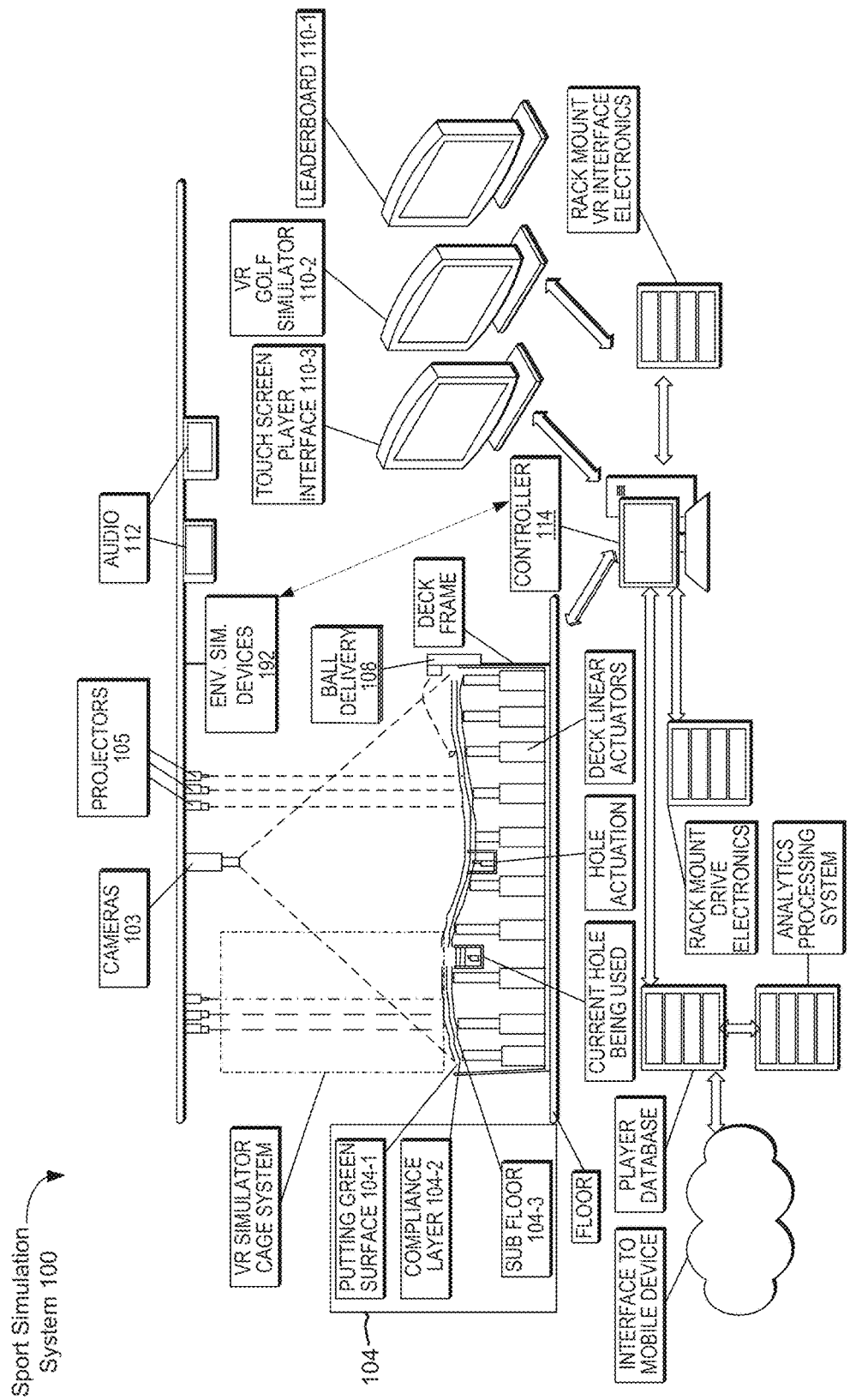
FIG. 1B is a schematic diagram of a sport simulation system in accordance with some embodiments.
Figure 1C:
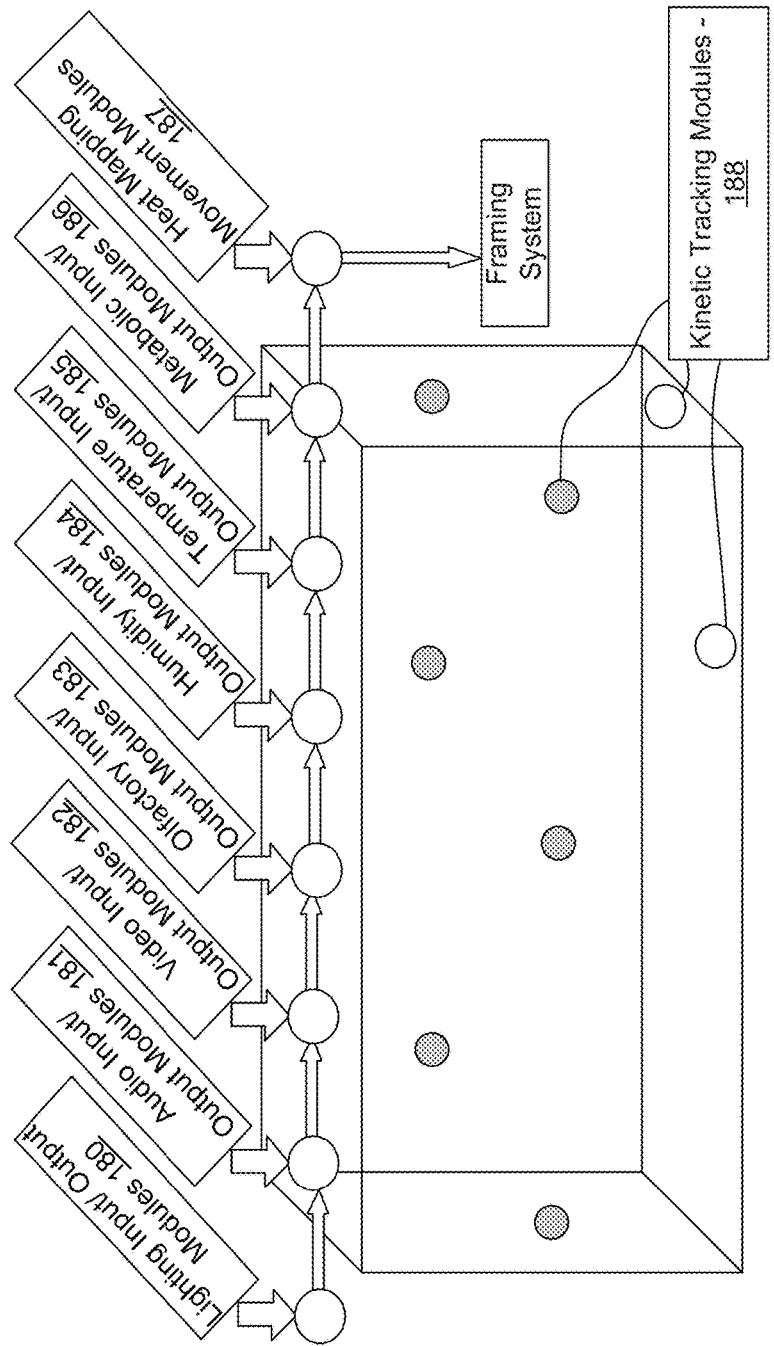
FIG. 1C is a schematic diagram showing environmental simulation modules that are part of a sport simulation system in accordance with some embodiments.
Figure 1D:
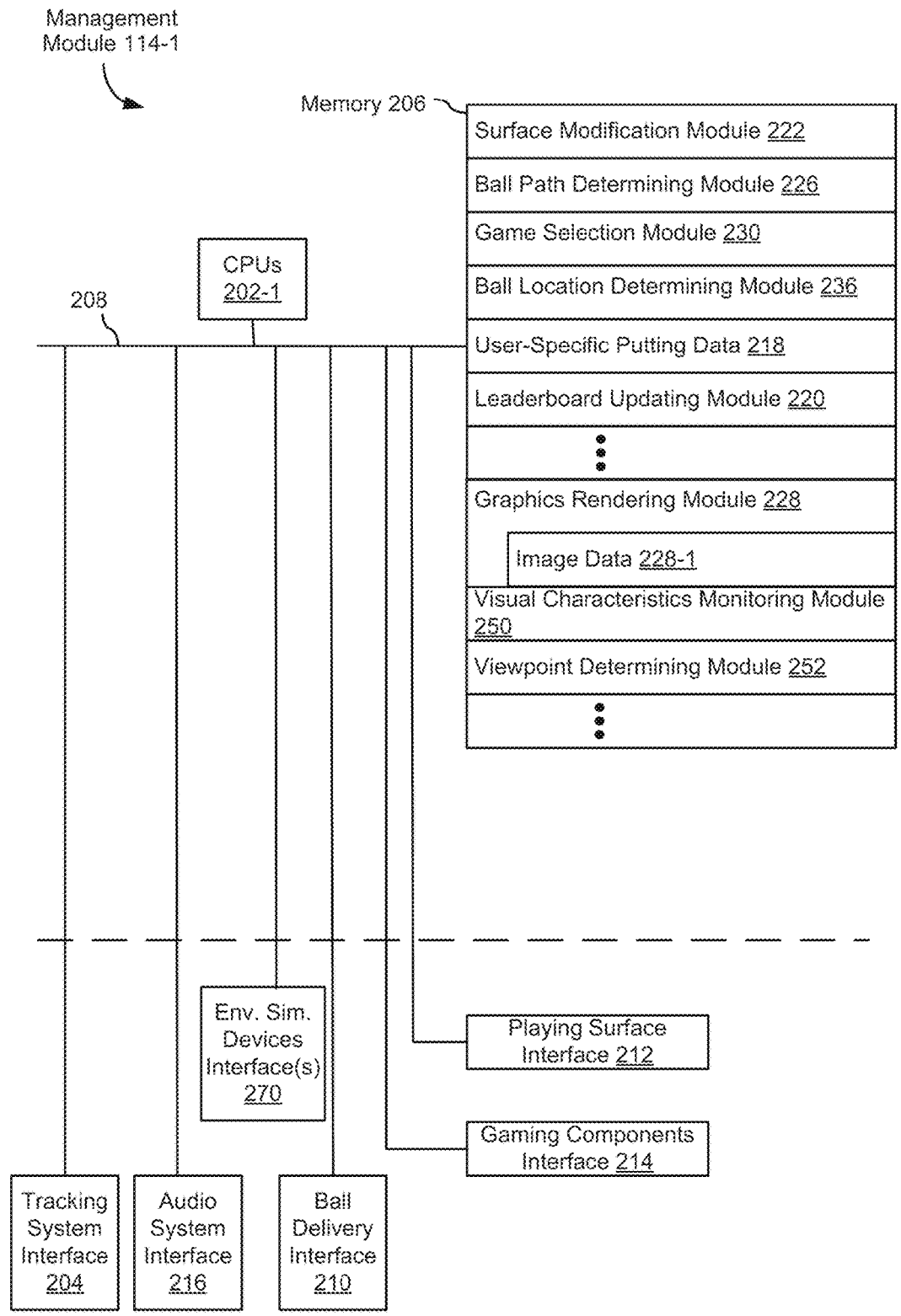
FIG. 1D is a block diagram of a system controller for a sport simulation system, in accordance with some embodiments.

In some embodiments, the visual sensors 103 are configured to track and monitor participants within the sports simulation system 100, to associate participants with sports balls (e.g., golf balls), track paths followed by the sports balls, and to send information regarding the aforementioned to the system controller 114 (or one of its components, such as ball path determining module 226 and ball location determining module 236, FIG. 1D).

In some embodiments, the visual sensors 103 are also configured to monitor visual characteristics associated with one or more game participants within the sports simulation system 100 (e.g., these monitored visual characteristics may include head position, physical position, eye game, and the like, which may be used to generate and then provide data to the projectors 105 that is used to display anamorphic images within the sports simulation system 100).

In some embodiments, the one or more projectors 105 are configured to render images onto a playing surface (e.g., playing surface 104) of the sport simulation system 100. Exemplary images that the projectors 105 are capable of projecting within the sports simulation system include anamorphic images that are projected in 2D for 3D viewing by one or more game participants within a physical gaming suite of the sports simulation system. Some example anamorphic images are described below in reference to FIGS. 3A-3D and FIGS. 4A-4G. In some embodiments, the one or more projectors 105 are configured to adaptively present anamorphic images so that the imagers are viewable in 3D even after participants have moved within the gaming suite, gaming events have been recognized (e.g., a user strikes a golf ball and sees 3D flames following the golf ball), and/or while the playing surface 104 is changing shape.

In some embodiments, the audio system 112 receives instructions from the system controller 114 to provide audio feedback to participants in games conducted at the sport simulation system 100. For example, in response to a respective participant sinking a challenging putt, the system controller 114 sends instructions to the audio system 112 to provide encouraging feedback to the participant (such as cheering noise). As another example, in response to a respective participant missing a putt, the system controller 114 sends instructions to the audio system 112 to provide instructional feedback to the participant (e.g., instructions on how to improve their putting stroke, align their feet properly, or other ways to improve their putting skills). In some embodiments and also in response to a respective participant missing a putt, the system controller 114 sends instructions to the projectors 105 to render video feedback (in conjunction with the instructional feedback) that supplements the auditory feedback (e.g., a video showing the participant's missed putting stroke and information about what aspects of the missed putting stroke caused the participant to miss the putt (such as their feet were improperly aligned or their struck the ball with too much force)). In some embodiments, guidance information (such as a best fit line or best path for a golf ball) is projected onto the surface by the projectors 105 and this guidance information also helps to improve participant's chances of making a shot.

In some embodiments, the gaming interfaces 110 include leaderboards 110-1, simulators 110-2, and mobile devices 110-3. In some embodiments, the leaderboards 110-1 present scoring information for each player of a respective game being played at the sports simulation system 100. In some embodiments, the leaderboards 110-1 are displayed on large display in front of the participants and may also be accessible through mobile devices 110-3 (e.g., by the mobile phones held by the individual participants). In some embodiments, the simulations 110-2 include golf simulators (or other ball tracking technology) that allows participants to simulate a round of 18-hole golf In some embodiments, the simulators 110-2 provide, to the system controller 114, information about a location of a respective participant's last shot (e.g., an approach shot to a virtual putting green of a simulated golf hole). In response to receiving the provided information, the system controller 114 determines an appropriate topography for the playing surface 104 (in order to simulate a topography of the virtual putting green based on the respective participant's approach shot and its landing location on the virtual green).

In some embodiments, the mobile devices 110-3 include touch-sensitive displays that allow users to interact with and control the sports simulation system 100 (e.g., to select new games or view other data available through the system 100).

In some embodiments, the playing surface 104 is a dynamic playing surface 104 that is capable of simulating a variety of various putting shots (as discussed below). In some embodiments, the dynamic playing surface 104 is capable of contouring to match topographies of real-life greens (e.g., by configuring one or more surface modification elements 106 to produce a desired topography at the playing surface 104, discussed below in reference to FIG. 2C). In other embodiments, the dynamic playing surface 104 is rigid and incapable of contouring, but is capable of tilting to simulate a variety of putting shots (e.g., as discussed below in reference to FIGS. 2A-2B). In some embodiments, the playing surface 104 is a fully actuated assembly controlled by the system controller 114 to be shaped into many different topographies. In some embodiments, the playing surface 104 is configured to be tipped, tilted, and/or contoured to replicate any putting green. In some embodiments, the playing surface 104 is rigid and is only capable of being tilted (as explained below in reference to FIGS. 2A-2C). In some embodiments, the playing surface 104 is controlled by many surface modification elements 106 (e.g., linear actuators) that push and pull on a sub-floor to make peaks and valleys on the playing surface 104. In some embodiments, the playing surface 104 includes a compliance layer (e.g., compliance layer 264, FIG. 2C) that moves with the contouring and provides compliance and density that a real green would have. In some embodiments, above the compliance layer there, a green surface (e.g., top surface 262, FIG. 2C) is provided that has surface roughness and properties of a real green to establish proper response of a golf ball rolling over it. In some embodiments, there are multiple holes that can be used independently depending upon the putting green configuration requested. In some embodiments, there can be an oversized hole to make it fun and a little easier for beginner golfers or children.

In some embodiments, the playing surface 104 is coupled with a hitting mat that deploys over the playing surface 104 at an appropriate time (e.g., when the user is hitting an iron shot, a chip shot, or a drive) and goes to a storage position when the user is putting. In some embodiments, one or more of hitting mats include a portion (e.g., a sub-component) of a ball delivery system 108, so that balls are quickly and easily delivered to the one or more hitting mats.

In some embodiments, the ball delivery system 108 is configured to send balls onto the playing surface 104. In some embodiments, the ball delivery system 108 sends the balls to predetermined locations on the playing surface 104. The predetermined locations are based on practice spot locations, game-specific putting locations, and the like. In some embodiments, the predetermined locations are based on where each respective participant hit their golf ball while using the simulators 110-2 and the ball delivery system 108 sends balls to predetermined locations corresponding to where each participant hit their golf ball in the simulator. In some embodiments, the ball delivery system 108 is configured to change ball delivery settings in order to achieve controlled ball delivery (such as speed, spin, launch angle) and, in some embodiments, the system controller 114 communicates with the visual sensors 103 in order to verify that balls have reached the predetermined locations. In accordance with a determination that a ball has not reached its corresponding predetermined location, the controller 114 instructs the surface modification elements 106 so that tilting or contouring the playing surface 104 will move the ball to the corresponding predetermined location.

In some embodiments, the ball delivery system 108 ensures that participants are not running all over to fetch golf balls on the playing surface 104. In some embodiments, the ball delivery system 108 is configured to place balls on the playing surface 104 based upon final shots on a VR simulator. In some embodiments, the ball delivery system 108 accounts for interaction of balls at edges of the playing surface 104.

In some embodiments, the ball delivery system 108 also delivers balls to a predetermined location for each participant to make multiple shots from the predetermined location (e.g., a difficult putt location from which a respective participant has missed many previous putts) while in a practice mode for the sport simulation system 100. In some embodiments, the ball management system that will funnel a ball to the hole for beginner players or kids to make it a positive experience. In some embodiments, bumpers are provided on the playing surface 104 in a children's practice mode to add an extra challenge. In these embodiments, cameras 103 and the guidance system 102 as a whole accommodates for the presence of the bumpers, while determining how to render visual aids on the playing surface 104.

In some embodiments, the system controller 114 includes a management module 114-1 that includes a number of modules that are responsible for exchanging information with each of the components of the sports simulation system (additional details are provided below in reference to FIG. 1D).

In some embodiments, the system controller 114 interfaces (e.g., using gaming components interface 214, FIG. 1D) with a mobile device that is provided to a participant and includes user interfaces that allow participants to get established, system mode to be selected, and selection of a type of game to be played at the sport simulation system 100. In some embodiments, there is provided a touch display that the game and guidance systems can use to display video capture of putts from each participant, video display of a proper putting motion, scores from either games or putting evaluations after a putt from a respective participant. In some embodiments, a tablet system is provided that any participant can use to command different features of each mode at the sport simulation system 100.

In some embodiments, the system controller 114 interfaces with a Virtual Reality Golf Simulator (e.g., one of the simulators 110-2, FIG. 1A) that identifies a topography of specific putting green the players are on for an 18-hole course that is being played. In some embodiments, the system controller 114 also interfaces (e.g., using one or more playing surface interfaces 212, FIG. 1D) with one or more surface modification elements 106 (e.g., one or more linear actuators) below the playing surface 104 to push and pull to create the identified topography for the specific putting green.

In some embodiments, the system controller 114 additionally interfaces with hole actuators (e.g., one or the surface modification elements 106 that is coupled with a removable, substantially circular portion of the playing surface 104) to enable correct hole position for the specific putting green being played. Any putting green can be simulated with the surface modification elements 106 (e.g., surface and hole control actuators). Once a respective simulator 110-2 indicates that that a shot made it to a putting green of a simulated golf course hole, the system controller 114 instructs a ball delivery system 108 to delivers a golf ball to a position on the playing surface 104 that matches the location reached by the shot. In some embodiments, the ball delivery system 108 is instructed to deliver balls to the playing surface 104 for all participants in a current 18-hole simulated golf round. In some embodiments, system controller 114, takes images using the visual sensors 103 (e.g., one or more cameras) to determine positions for each player's putt.

In some embodiments, the sport simulation system is configured to operate in multiple modes based on experience levels for the game participants. In accordance with a determination that a current mode of operation for the sport simulation system 100 is a training mode, the projectors 105 (also used to control a guidance system) is controlled (by the system controller 114) to show a best fit line (also referred to interchangeably herein as a best fit curve, best path, best putting path, and ideal putting line) from the ball to a hole on the playing surface 104. While in training mode, the projectors 105 are also instructed, in some embodiments, to render a ball target on the playing surface 104, a putter back-and-forth distance and speed required, and a grid showing the lay of the green or sloping gradient of the green. In some embodiments, colors or water movement graphics are projected onto the playing surface 104 in order to show topography of the playing surface 104. In some embodiments, the grid is utilized in combination with colors or water movement while, in other embodiments, only one graphic is utilized to show the topography of the playing surface 104. In some embodiments, the aforementioned graphics are provided for each participant in the game. In this way, a guidance system is provided that teaches or trains a non-golfer or even an experienced golfer how to play or better their short games and read greens.

In some embodiments, the guidance system further includes micro-chips located in each golf ball utilized with sport simulation system 100 to interface with the system controller 114 and inform each player what went wrong during a putt and to advise on possible corrective actions. In some embodiments, the golf balls do not include microchips.

In some embodiments, system controller 114 also interfaces with an audio system (e.g., using audio system interface 216, FIG. 1D) to give feedback to each participant on their training progress and tips for subsequent shots, if required. In some embodiments, the audio system 112 is controlled by the system controller 114 and is instructed to output various phrases as the ball travels to the hole. For example, there can be audio for "looks like a good putt at the start," to cheers as the ball gets close, to "Aws" if the putt is missed, and the like.

Attention is now directed to FIG. 1B, presenting a schematic diagram of the sport simulation system 100 described above in reference to FIG. 1A. In some embodiments, a base and frame is provided that houses numerous surface modification elements 106 (e.g., numerous linear actuators) that change the topography of a playing surface 104 (also referred to as a dynamic surface 104) that is moved by the surface modification elements 106. In some embodiments, the playing surface 104 includes a putting green surface 104-1, a compliance layer 104-2, and a sub-floor structure 104-3. The components and make-up of the playing surface 104 is described in more detail below in reference to FIGS. 2A-2B (embodiment in which the playing surface 104 is rigid, not contour-able, but still tilt-able) and FIG. 2C (embodiment in which the playing surface 104 is contour-able).

In some embodiments, the base system of the playing surface 104 is constructed from steel or aluminum and welded or otherwise fastened together. In some embodiments, the surface modification elements (e.g., deck linear actuators 205 shown in FIG. 2B, such as hydraulic or pneumatic linear actuators). In these embodiments, the actuators interface to the framing system and are bolted in place. In some embodiments, the surface modification elements are below three layers of the playing surface 104 (e.g., a first layer such as a putting green, a second layer such as a compliance layer, a third layer such as sub-floor structure). Additional information regarding the three layers is provided in reference to FIG. 2C.

In some embodiments, the number of actuators required below the three layers is dependent upon the structural support required and the contour needed to generate different green shapes and multiple configurations. In some embodiments, only three actuators are utilized to tilt a rigid playing surface 104 (as explained below in reference to FIGS. 2A-2B) while, in other embodiments, numerous actuators are utilized to contour a flexible playing surface 104 (as explained below in reference to FIG. 2C).

In some embodiments, the playing surface 104 is positioned over a movable underlying layer (including but not limited to the actuators, bearings, compliance layer, sub floor structure, and/or any other materials and mechanisms which allow the overlying surface to change topography while bearing weight of up to 12 players). Additional information regarding layers of the playing surface 104 is provided in reference to FIG. 2C.

In some embodiments, the movable underlying layer is coupled to each actuator to allow the actuators to push and pull the floor to distort the surface topography. In some embodiments, a compliance layer (e.g., compliance layer 264, FIG. 2C) made of foam that is of an appropriate density and is laminated to the subfloor (e.g., sub-floor structure 266, FIG. 2C). In some embodiments, the density of the compliance layer will replicate the density of an actual putting green. In some embodiments, the final layer is the green layer or the top surface (e.g., top surface 262, FIG. 2C) and that is laminated to the compliance layer. In some embodiments, the top green layer is selected to meet the surface properties of an actual green so that the golf ball motion is very similar to a real putting green.

In some embodiments, the controller or computer system (e.g., system controller 114, FIGS. 1A and 1B) is a commercial-off-the-shelf high speed rack mounted processing system. In some embodiments, the controller 114 has interfaces to all the peripherals (e.g., tracking system interface 204, audio system interface 216, ball delivery interface 210, playing surface interface 212, and gaming components interface 214, FIG. 1D), memory for image processing and control algorithms (e.g., modules included in memory 206, FIG. 1D), and houses the control software in non-volatile memory (e.g., memory 206, FIG. 1D) that can be reprogrammed during testing and integration.

In some embodiments, an audio and visual guidance system (e.g., tracking system 102, FIG. 1A, including cameras 103 and projectors 105 shown in both FIGS. 1A and 1B) is located above the playing surface 104. In some embodiments, a camera system is coupled to the ceiling (e.g., cameras 103). In some embodiments, a lighting system (e.g., as a component or additional piece of projectors 105) is coupled to the ceiling and the audio system. In some embodiments, the interfaces are RF or wireless to reduce cabling between the guidance system and the control computer.

Some embodiments include multiple hole locations under the different green configurations. For example, there may be a current hole being used and other holes not currently being used (as shown in FIG. 1B). These embodiments may include a ball management system; ball delivery system (e.g., ball delivery system 108); a ball funneling system; a ball retrieval system; ball bumpers; etc.

Figure 2C:
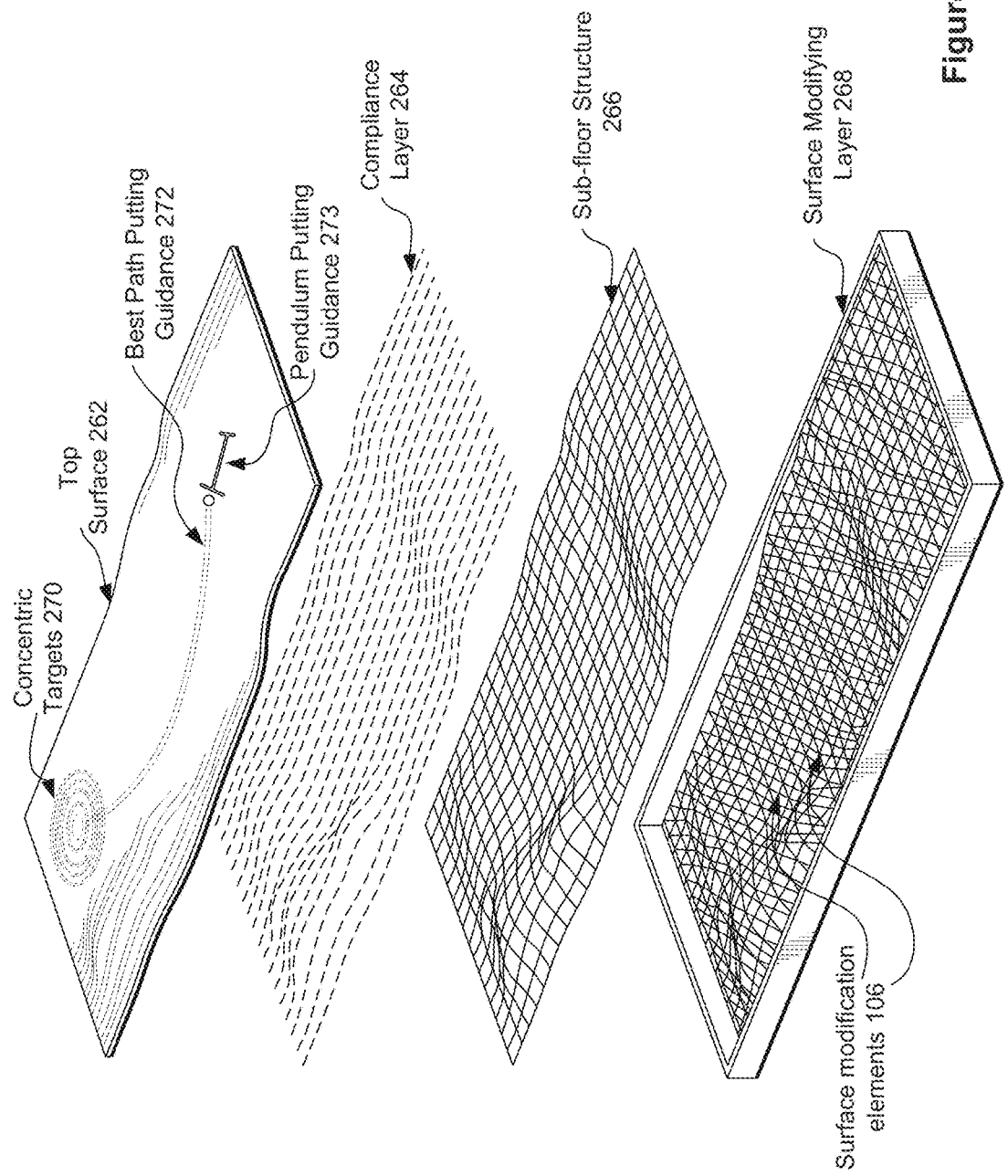
FIG. 2C is a schematic diagram showing a second embodiment (an alternative to the first embodiment) of a dynamic playing surface used in a sport simulation system, in accordance with some embodiments.

Also in some embodiments, the system controller 114 is configured to move the movable underlying layer (e.g., the surface modifying layer 268, FIG. 2C). This controller includes a processor and memory for executing instructions for controlling surface topography (shown in FIG. 1D). An interface, such as a touch screen interface, is provided for player input. The controller (or control computer) and its components are shown in FIG. 1D.

In some embodiments, a guidance system may also be provided (e.g., using projectors 105 of the tracking system 102, FIG. 1A). The guidance system may include a doppler system; a camera; one or more displays; and a visual guidance system for overlaying lines, circles, symbols, numbers, and annotations over the topography. In some embodiments, the lines include a grid, gradient/contour lines, a best fit line, a stroke length line-back; a stroke length line-front; an ideal ball path; a ball target point; a variable speed ball path; etc. all overlaid over the topography. The guidance system may also calculate and provide a distance-to-hole measurement; an elevation measurement; computer generated imagery for ball and surface technology for player feedback; etc. The guidance system may also include guidance system-audio; a controller; ball microchip technology for ball motion and for training; instructions for visual guidance based upon ball location from hole and surface properties; instructions for generating audio feedback based upon closed loop camera interface; instructions for mode control; a virtual reality simulator interface.

As shown in FIGS. 1A-1B, in some embodiments, the sport simulation system 100 includes a number of environmental simulation devices 192 that are positioned within the sport simulation system 100.

FIG. 1C is a schematic diagram showing environmental simulation devices 192 that are part of the sport simulation system 100 in accordance with some embodiments.

As shown in FIG. 1C, the environmental simulation devices 192 include lighting input/output modules 180 (e.g., for controlling visual ambiance within a physical gaming suite), audio input/output modules 181 (e.g., including audio system 112 and one or more microphones, speakers, and the like), video input/output modules 182 (e.g., including projectors 105 and cameras 103), olfactory input/output modules 183 (e.g., including one or more odor emitters and particle counters), humidity input/output modules 184 (e.g., including one or more humidifiers and misters), temperature input/output modules 185 (e.g., including one or more a/c and heating units), metabolic input/output modules 186

(e.g., including one or more human body sensors), heat mapping movement modules 187, and kinetic tracking modules 188 for floor kinetic tracking.

In some embodiments, the above environmental simulation modules are positioned within a physical gaming suite that includes many (or all) of the components described above with respect to FIGS. 1A-1B (e.g., physically coupled with a portion of a framing system for the physical gaming suite). In some embodiments, the floors and walls of the physical gaming suite (e.g., such as physical gaming suite 300, FIG. 3A) are made of many different types of materials, by a supply system for materials with quantity and quality controlled in order to insure that surface shape is configurable (e.g., tilt-able and/or contour-able as explained below in reference to FIGS. 2A-2C), resulting in physical surfaces that are both aesthetically-pleasing and highly functional for producing an immersive VR experience.

In some embodiments, the kinetic tracking modules 188 and the heat mapping movement modules 187 comprise a plurality of floor sensors, visible light cameras, and infrared cameras. In some embodiments, the cameras and floor sensors track and monitor motions of the players during the game play to generate data. In some embodiments, the floor sensors monitor the motion of the player to analyze driving and putting motions and to monitor the game play. In some embodiments, the kinetic tracking system collects data during putting and driving, and the collected data is processed and used to give the player tips on their swing and putting to improve the player's skills and form good habits.

In some embodiments, the images taken by both visible light cameras and infrared cameras are combined and stitched to provide information in both visible physical features and human body thermal mapping. In some embodiments, the thermal images present intensities of human body thermal signature characteristics corresponding to intensities of thermal response of various body parts. In some embodiments, facial feature thermal mapping is used to determine head direction and position. In some embodiments, high rate visible images are the primary source for eye tracking.

In the system 100, both the visible and infrared images are used for eye and head tracking. In some embodiments, the floor sensors track the player's motion and position information during a game play via the player's feet position during putting and swinging a club and weight transfer during club motion. In some embodiments, the system uses the images taken by the cameras and the information tracked by the sensors to provide feedback to the player to improve their swing and putting to advance their game. In some embodiments, the system performs complex image processing and swing analytics for club and putting, to provide tips to improve the player's form and to enhance their game.

The system 100 also uses the environmental simulation devices 192 to provide environmental effects that enhance a game participant's experience and interaction with the system. In some embodiments, the temperature input/output modules 185 are used to adjust temperatures according to a simulated location for a game participant during a current game, for example, ranging from conditions at Pebble Beach, Calif. in the summer to a golf course in Ireland in the winter. In some embodiments, the lighting input/output modules 180 also adjust lighting for golf play in the morning, afternoon, or evening, while taking into account random and changing variables such as clouds. In some embodiments, the humidity input/output modules 184 adjust humidity depending upon the simulated game played in different locations, for example, in Las Vegas or Florida. In some embodiments, the environmental simulation devices 192 are also utilized to generate gentle wind to simulate the general environment at a physical golf course.

In some embodiments, the user predefines a set of environmental variables in which to practice, in order to improve their golf skills. In some embodiments, the environmental effects are monitored via sensors. In some embodiments, the computer system controls sensors to monitor humidity, temperature, wind speed, and/or lighting of the game space. In some embodiments, the computer system controls the environmental conditions by interfacing with the HVAC system (e.g., via temperature input/output modules 185), wind generation system, humidity generation system (e.g., via humidity input/output modules 184), and lighting system (e.g., via lighting input/output modules 180). In some embodiments, as the clouds go by in the simulated environment, the system adjusts the lighting, temperature, and projection accordingly to simulate environmental conditions during an outdoor game of golf.

In some embodiments, sounds within the sports simulation system 100 are also controlled in order to provide and improve the immersive virtual reality experience during game play. In particular, a sound transforms a game participant's feeling from happiness, to nervousness, to excitement. Along with tactile interactions within the sport simulation system, sound allows game participants to immerse themselves into the reality of game play. In some embodiments, based upon where the golf course is and what hole the players are on, the audio input/output modules 181 (e.g., the audio system 112, FIG. 1A) adjusts sound coming from within the virtual environment accordingly. In an example, when a putt is made, the sound of cheering from a crowd is generated and provided. In another example, the sound of the ocean when the user is playing at a golf course next to a sea cliff is generated and provided. In another example, the modules 181 generate a sound of birds chirping on the course. In yet another example, the modules 181 generate a sound of a fountain next to the clubhouse at the last hole (e.g., and provide those sounds via audio system 112). In some embodiments, the modules 181 generate the sound of the wind through the trees.

Smell is another sense that evokes emotion. For example, when a person passes a French bakery and smells that fresh baked croissant, this person may feel happy and at peace in response. In some embodiments, the olfactory input/output modules 183 replicate smells based upon gaming data for a particular game participant. For example, the modules 183, when implemented in the system 100, generate the smell of fresh cut grass, the smell of a flower garden, the smell of the green next to the ocean, the smell of the pine trees next to the fairway, and/or the smell of cooked hotdogs and burgers at the end of the 18th hole located at the club house. The olfactory input/output modules 183 invoke the human sense of smell and thus further enhance and improve user experiences in the system 100.

In some embodiments, audio input/output modules 181 also include one or more microphones. In some embodiments, the one or more microphones are integrated within the system 100 for voice recognition as well as for system commanding and control. In some embodiments, voice recognition is used for the system 100 to identify user identity, the user profile, the user database, the user golf driving and putting habits, and/or the user long-term positive and negative trends associate with golf play, such that the system 100 customizes tips associated with game play as the user continues to use the system. In some embodiments, the modules 181 are configured to personally addresses users and act as a caddie with tips to help with game play, and the assistance provided changes over time as the player advances his or her game play. In some embodiments, the game participants use voice commands to control game play within the system 100. In some embodiments, the system 100 provides further practice, repeats putts or approach shots, and shows replays to the user using user's voice commands to enhance user experience.

In some embodiments, the one or more microphones are also utilized to collect feedback about presentation of images within the system 100. For example, after a 2D image is presented for 3D viewing within the physical gaming suite, the one or more microphones detect and collect feedback from game participants related to the presentation of the images (e.g., whether the 3D effect is perceived, whether the image is presented too brightly or takes up too much space, and the like). After collecting the auditory feedback, the system 100 analyzes the feedback and uses it to improve future presentation of 2D images within the physical gaming suite (e.g., in order to improve appreciation of a 3D effect by the game participants).

In some embodiments, the environmental simulation devices 192 are also used to project 2D images (e.g., anamorphic images) for 3D viewing by game participants within a physical gaming suite. For example, some embodiments provide a real-time visual subsystem (e.g., visual input/output modules 182) within the sports simulation system 100 described above and the real-time visual subsystem comprises a plurality of digital projectors (e.g., multiple projectors 105 of FIG. 1A) for projecting 3D images onto a 2-dimensional (2D) space (e.g., a wall or the ceiling of a physical gaming suite). In some embodiments, the projectors project images on one, two, three, or four walls (and/or a ceiling) to present 2D images for 3D viewing by one or more game participants within the physical gaming suite (as described in detail below in reference to FIGS. 3A-3D, 4A-4G, 5A-5C, and 6).

In some embodiments, the images projected by the plurality of projectors are constantly updated based upon the data tracked by one or more high speed digital cameras (e.g., one or more of visual sensors 103, FIG. 1A) using a tracking algorithm. For example, while playing a golf game in a physical gaming suite, the plurality of projectors present to a player dynamic views that are related to Pebble Beach hole one from the tee location, on the fairway for drives and approach shots, and all the way up to the putting green, so that the player has a real and immersive 3D experience as if the player is playing at the Pebble Beach.

In some embodiments, the sports simulation system 100 accommodates one or more players, e.g., from 1 to 4 players. In some embodiments, while the players are playing a game within the physical gaming suite, the system uses an optimization algorithm to generate 2D images (e.g., anamorphic images) that are concurrently presented to each player and projects the generated 2D images on one or more surfaces of the physical gaming suite. In some embodiments, the optimization algorithm is used to optimize projected views based upon the images collected from the cameras 103. For example, the optimization is performed based upon where each player is standing in the game space, and where the eyes of each player are looking (or an average estimate of an optimal viewpoint based on visual characteristics associated with multiple game participants, as described below in reference to FIGS. 3A-3D, 4A-4G, 5A-5C, and 6). In some embodiments, the optimization algorithm uses images tracked by the high rate digital cameras and data received from the cameras and motion sensors in the system.

In some embodiments, synchronized high rate (e.g., >30 Hz) cameras are placed overhead and at discrete locations around the game space. In some embodiments, the cameras capture the players' interactions with the environment. In some embodiments, the number and positions of the cameras are designed to allow a plurality of cameras to view any object in the game space simultaneously. In some embodiments, the number and positions of cameras are optimized, depending on the gaming environment, to enhance the ability to view any object on the deformable surface for a minimum of 3 views to improve triangulation accuracy.

In some embodiments, the real-time visual system comprising the projectors is designed to monitor the environment, compute the correct view geometry for each player, and project the relevant images corrected based on viewpoint into the immersive environment at a framerate of each camera with a latency of less than 0.05 second. In some embodiments, the real-time visual system displays images at about 120 Hz to eliminate flicker and motion artifacts from the players. In some embodiments, these high computational rates are achieved by combining efficient image processing algorithm and predictive motion modeling of the players and objects in the environment.

In some embodiments, the view presented to one or more game participants depends primarily on a viewpoint that is based on visual characteristics associated with one or more game participants. In some embodiments, the viewpoint is determined based at least in part on visual characteristics for multiple game participants (e.g., standing/sitting position, head position, eye game, and the like). In some embodiments, the overhead cameras are used to compute and maintain a continuous 3D reconstruction of the environment of the game space, which includes the game participants and their head positions. In some embodiments, the game participant's gaze direction is determined by face tracking and geometric inference from facial features, such as the location of the eyes in the camera imagery. In some embodiments, eye tracking technology is used to further refine the computation of gaze direction to determine the focus of each player.

In some embodiments, the tracking and computation of each game participant's viewpoint is continuous, determining the imagery to project into the environment is continuous, and adjusting the environment to the focus of each individual player is also continuous. In some embodiments, the combination of face tracking and geometric tracking allows the sports simulation system 100 to maintain the identity of each game participant at all times. In some embodiments, as objects leave a physical environment (e.g. driving a golf ball), the system 100 seamlessly hands-off from the tracking of the object in the physical environment to displaying a dynamic copy of the object in the projected virtual space.

In some embodiments, the VR sports system 100 provides each of the one or more users in the game space with 360-degree views. In some embodiments, the eye-tracking technology as disclosed above tracks each user's eye gaze and eye movements, and the 3D view projected to the place each user is looking at is customized to display a portion of the content in 3D to the particular user. In some embodiments, the projected 360-degree views are not 3D to all users at the same time, but the system projects a portion of the 360-degree views to a particular user such that the user perceives a 3D view of this portion. In some embodiments, the system uses visual cues to attract/direct different user's eye gaze to different parts of the scene concurrently to avoid overlap and non-3D views. In some embodiments, even if multiple users are looking at the same spot, they are immersed in their individual 3D experience and focus on their own 3D views, such that they are not distracted by the non-3D content.

Additional details regarding presentation of 2D graphics for 3D viewing are provided below in reference to FIGS. 3A-3D, 4A-4G, 5A-5C, and 6.

FIG. 1D is a block diagram illustrating a management module 114-1, in accordance with some embodiments of the sport and game simulation system shown in FIGS. 1A and 1B. Management module 114-1 typically includes one or more processing units (sometimes called CPUs or processors) 202-1 for executing modules, programs, and/or instructions stored in memory 206 (and thereby performing processing operations), memory 206 (sometimes called controller memory), and one or more communication buses 208 for interconnecting these components. The one or more communication buses 208 optionally include circuitry (sometimes called a chipset) that interconnects and controls communications between system components. Management module 114-1 is coupled to tracking system interface 204 (to allow the system controller 114 to exchange information and provide instructions to the tracking/guidance system 102), audio system interface 216 (to allow the system controller 114 to exchange information and provide instructions to the audio system 112), ball delivery interface 210 (to allow the system controller 114 to exchange information and provide instructions to the ball delivery system 108), playing surface interface 212 (to allow the system controller 114 to provide instructions to the playing surface 104 and the surface modification elements 106), gaming components interface 214 (to allow the system controller 114 to exchange information and provide instructions to the leaderboards 110-1, simulators 110-2, and the mobile devices 110-3), and environmental simulation devices interface(s) 270 (to allow the system controller 114 to exchange information and provide instructions to the environmental simulation devices 192, FIG. 1C).

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 202-1. Memory 206, or alternatively the non-volatile memory device(s) within memory 206, comprises a non-transitory computer readable storage medium.

In some embodiments, memory 206, or the non-transitory computer-readable storage medium of memory 206 stores the following programs, modules, and data structures, or a subset or superset thereof:
- surface modification module 222 for providing instructions to one or more surface modification elements (e.g., surface modification elements 106, FIG. 1A) in order to contour or tilt a playing surface (e.g., playing surface 104);
- ball path determining module 226 for determining an ideal path from a position on a playing surface (e.g., playing surface 104, FIG. 1A) at which a ball is currently located and to a hole on the playing surface;
- game selection module 230 for providing user interfaces that allow participants to control operations and gaming modes at a sport simulation system (e.g., sport simulation system 100, FIG. 1A);
- ball location determining module 236 for identifying locations of balls on a playing surface (e.g., playing surface 104, FIG. 1A);
- user-specific putting data 218 for storing information about putting characteristics and historical putts for each respective participant at a sport simulation system (e.g., sport simulation system 100, FIG. 1A) so that the stored information is available for future processing and use by the sport simulation system (e.g., to provide more accurate and user-tailored best fit lines);
- leaderboard updating module 220 for updating a leaderboard (e.g., one of the leaderboards 110-1) to include point data for each participant in a particular game at a sport simulation system (e.g., sport simulation system 100, FIG. 1A);
- graphics rendering module 228 for providing instructions to one or more projecting devices (e.g., one or more projectors 105, FIG. 1A) in order to render graphics (e.g., generated anamorphic images that are based on image data 228-1) on a playing surface (e.g., playing surface 104, FIG. 1A);
- visual characteristics monitoring module 250 for monitoring visual characteristics associated with one or more game participants within a physical gaming suite; and
- viewpoint determining module 252 for determining respective viewpoints for each game participant and for determining an average/common viewpoint for two or more game participants (also referred to herein as an optimal viewpoint).

In some embodiments, memory 206 of management module 114-1 also includes one or more of: an operating system that includes procedures for handling various basic system services and for performing hardware dependent tasks; a network communication module that is used for connecting the controller 114 to other subsystems of the system 100 via the one or more network interfaces (wired or wireless) to one or more networks; a VR module that communicates with the subsystems to receive information tracked by the subsystems (e.g., eye gaze and movement of each user and motion of golf balls tracked by the high speed cameras, voice commands received by the microphones, etc.), and to process and provide data related to the VR experience to the users (e.g., 3D images to be projected to each user, 3D sound effects to be played to the user, etc.); and a VR database 242 that stores data related to simulated scenes for different games and user profiles. In some embodiments, memory 206 also includes a user profile, which stores user records, each including, for example, a user profile (e.g., a user ID, an account name, login credentials, and/or custom parameters such as a user's age, a user's home location, and/or one or more parameters indicating interests of the user), custom parameters for the user (e.g., age, location, hobbies, etc.), social network contacts, groups of contacts to which the user belongs, and identified trends and/or likes/dislikes of the user.

In some embodiments, memory 206 also includes Golf Course Library 244, which stores preset data that is used to simulate different golf courses, including, but is not limited to: Golf Scenery Environment Data that is related to various golf course views, environment sounds (e.g., bird chirping or ocean breeze), and scents (e.g., fresh cut grass scent); Putting Surface Data that is related to topography, textures, roughness, and hole layouts of various putting surfaces; and Tournament Sound Effect Data that is related to sound effect (e.g., crowd cheering) that provides a simulated tournament sound experience to the user. Memory 206 may also include data for games other that golf, such as Surfing Library which stores preset data that is used to simulate various surfing environments at different beaches; Snowboarding Library which stores preset data that is used to simulate various snowboarding environments at different resorts or mountains; and Touring Library 256 which stores preset data that is used to simulate tourism spots all around the world at present, a historical time, or a future time.

Examples of one or more networks (e.g., connecting controller 114 to the various devices that are positioned within the system 100) include local area networks (LAN) and wide area networks (WAN) such as the Internet. One or more networks are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 1D shows management module 114-1 in accordance with some embodiments, FIG. 1D is intended more as a functional description of the various features which may be present in management module 114-1 than as a structural schematic of the embodiments described herein. In practice, and as recognized by those of ordinary skill in the art, the programs, modules, and data structures shown separately could be combined and some programs, modules, and data structures could be separated.

Attention is now directed to FIGS. 2A-2B and 2C, showing alternative embodiments, respectively, of a playing surface used in a sport simulation system, in accordance with some embodiments.

As shown in FIGS. 2A-2B, a playing surface 104 is a rigid playing surface 104 (i.e., a surface that is incapable of contouring) that is tilt-able using one or more actuators 205. In some embodiments rigid playing surface 104 includes a top surface (e.g., including a surface texture or material that simulates a putting green), floor panels (e.g., ¼ inch aluminum floor panels that are beneath the top surface, one or more module deck segments (e.g., modular deck segments 201, FIG. 2B, that may be welded aluminum C-channel with cross-bracing), an i-beam platform (e.g., i-beam platform 203 that is bolted together to provide floor strength and a stiff/rigid support unit). In some embodiments, each i-beam is bolted together to form the i-beam platform.

In some embodiments, rigid playing surface 104 further includes one or more actuators (e.g., actuators 205) that are located at specific positions relative to the i-beam platform 203 in order to tilt the playing surface 104. In embodiments in which the rigid playing surface 104 is included in a golf simulation system, by tilting the playing surface 104, many various breaking putts are possible. Moreover, by requiring only a limited number of actuators 205 to produce sufficient tilt, cost-savings is also achieved over embodiments in which numerous actuators are utilized (e.g., as discussed below in reference to FIG. 2C).

FIG. 2C illustrates an alternative embodiment to the playing surface 104 discussed above with respect to FIGS. 2A-2B, in which playing surface 104 is contour-able. In these alternative embodiments, the playing surface 104 includes four distinct layers. A first layer is a surface modifying layer 268 that includes a plurality of surface modification elements 106. A second layer is a sub-floor structure 266. A third layer is a compliance layer 264 that is used to ensure that the playing surface 104 feels like a real-life green while a participant is walking on the playing surface 104. A fourth layer is a top surface 262. In some embodiments, by modifying positions (e.g., a first lowered position and a second raised position for each of the elements 106) of the surface modification elements 106, the top surface 262 is contoured to match topographies of real-life greens (as discussed throughout). In some embodiments, the elements 106 are actuators that are configured to raise or lower to one or more predefined positions. In some embodiments, each surface modification element 106 is configured to position at a lowered position and a raised position. In other embodiments, each surface modification element 106 is configured to position at a lowered position and at a number of raised positions (e.g., 10 inches, 14 inches, 16 inches, etc.).

In some embodiments, a tracking/guidance system (e.g., tracking/guidance system 102) projects images/graphics onto the top surface 262. For example, the system 102 receives instructions from a system controller (e.g., system controller 114) to render representations of concentric targets 270 (could be of any predetermined shape and these are used to provide scores to participants during a game), best path putting guidance 272, and pendulum putting guidance 273.

In some embodiments, 2D images are generated for viewing in 3D and are presented on the top surface 262 (and/or over one or more other surfaces or objects within a physical gaming suite. In some embodiments, the 2D images are modified based on a current tilt and/or contour of the playing surface 104. Additional details regarding presentation of 2D graphics for 3D viewing are provided below in reference to FIGS. 3A-3D, 4A-4G, 5A-5C, and 6.

Figure 3A:
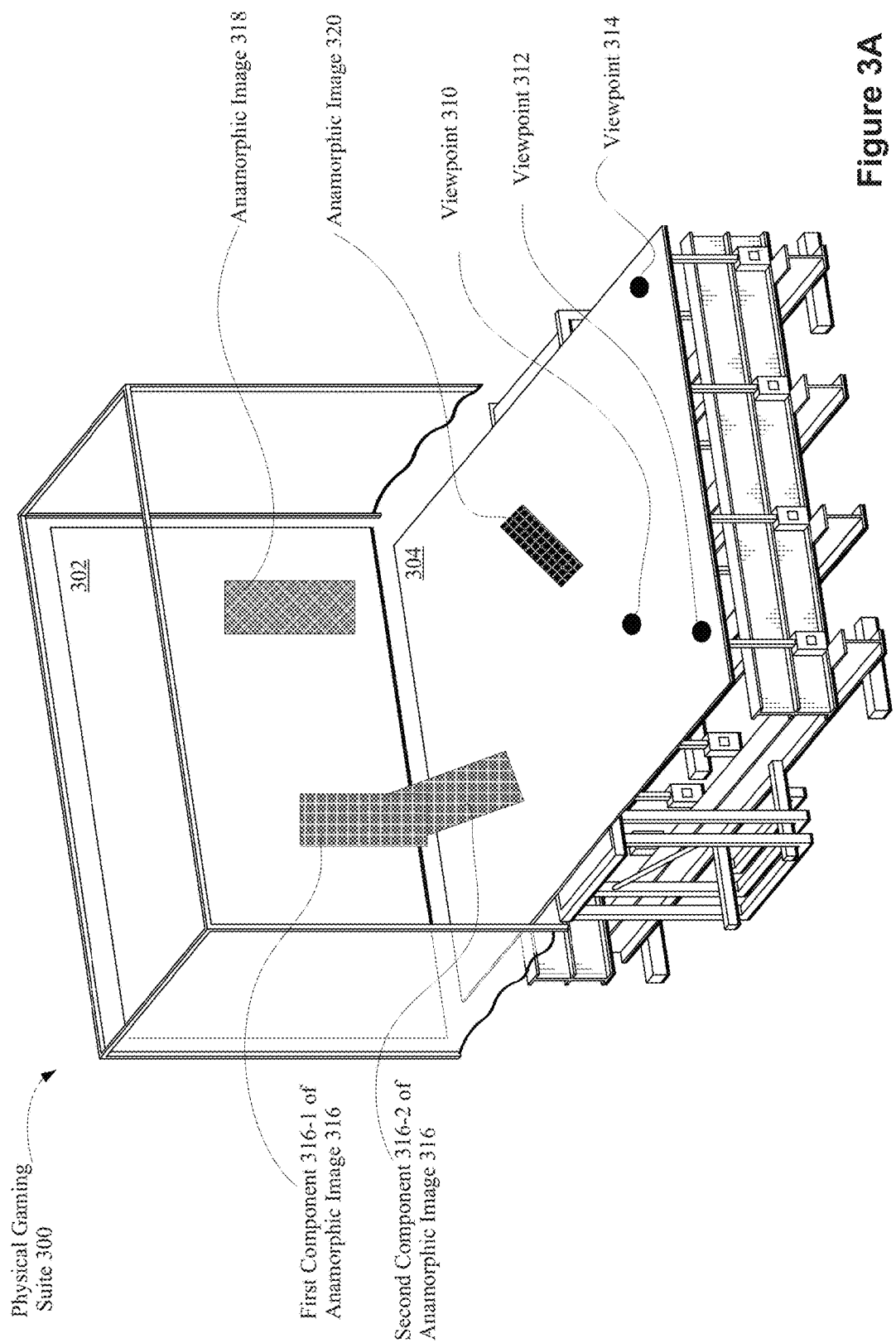
FIG. 3A is a schematic diagram showing a physical gaming suite with anamorphic images projected therein, in accordance with some embodiments.

Attention is now directed to FIG. 3A, which is a schematic diagram showing a physical gaming suite with anamorphic images projected therein, in accordance with some embodiments. As shown in FIG. 3A, embodiments disclosed herein are capable of projecting anamorphic images on one or more surfaces within the physical gaming suite 300, including a bottom surface 304 (e.g., a deformable surface, such as that described in reference to FIG. 2C above) and/or a back surface 302 (e.g., a projection screen that is included within the physical gaming suite). In some embodiments, the bottom surface 304 is substantially perpendicular to the back surface 302. For example, the bottom surface 304 is a playing surface (e.g., playing surface 104, FIGS. 1A-1B) on which a game is played by game participants (e.g., a putting game).

Figure 3D:
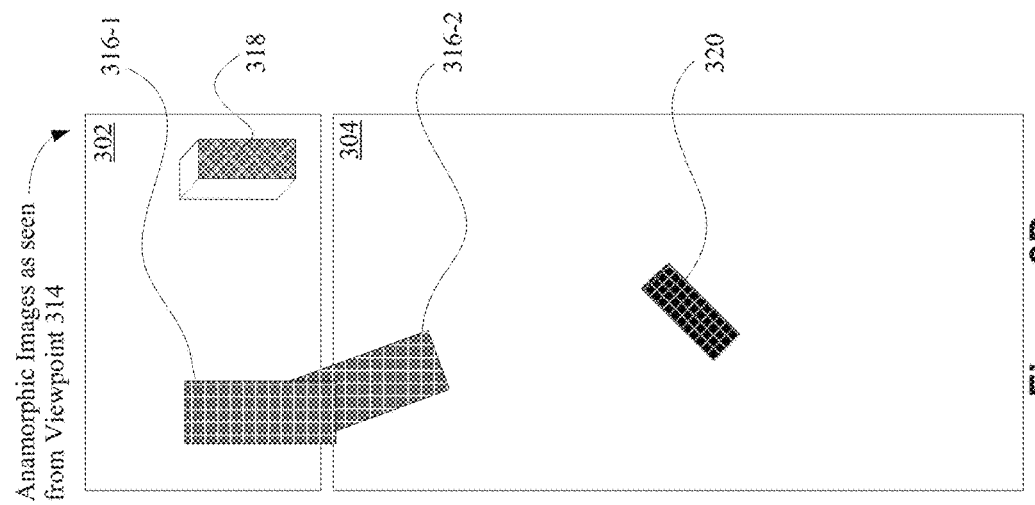
FIGS. 3B-3D are schematic diagrams showing how the anamorphic images of FIG. 3A appear from different viewpoints within the physical gaming suite, in accordance with some embodiments.
Figure 3C:
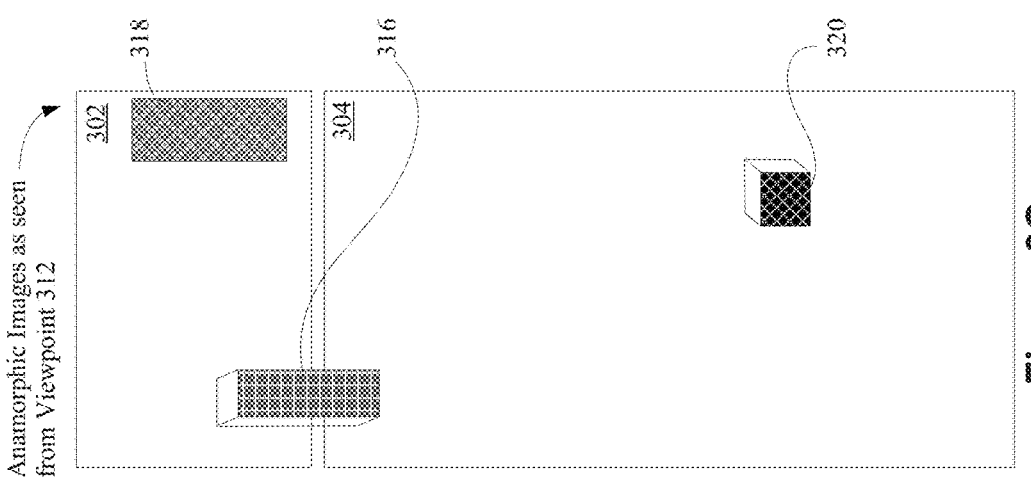
Figure 3B:
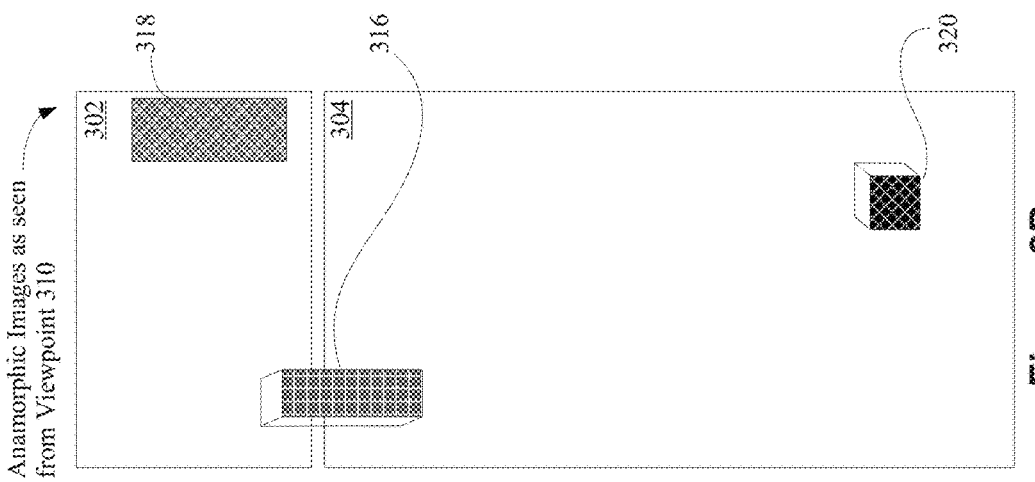

Some embodiments also project images on or over side surfaces, ceiling surfaces, and other objects within the physical gaming suite such as chairs, hula hoops, golf clubs, and others. As explained in more detail below, anamorphic images are presented within the physical gaming suite as 2D images (as shown in FIG. 3A) that are viewable in 3D by game participants within the physical gaming suite 300 (examples of 3D viewing of the images are shown in FIGS. 3B-3D from various viewpoints within the physical gaming suite 300). In some embodiments, respective anamorphic image is viewable in 3D by only those game participants whose viewpoints were utilized in generating the respective anamorphic image (i.e., only some game participants are able to appreciate a 3D effect for a particular anamorphic image that is projected within the physical gaming suite).

FIG. 3A shows a first anamorphic image 316 that is presented on a combination of the back surface 302 and the bottom surface 304 of the physical gaming suite 300. In some embodiments, presenting the first anamorphic image 316 includes presenting a first component 316-1 of the anamorphic image 316 on the back surface 302 and presenting a second component 316-2 of the anamorphic image 316 on the bottom surface 304. In some embodiments, the first and second components are determined so that the anamorphic image 316 is properly viewable in 3D by at least two game participants within the physical gaming suite (e.g., game participants that are associated with viewpoints 310 and 312).

FIG. 3A also shows a second anamorphic image 318 that is presented on the back surface 302 of the physical gaming suite 300. In some embodiments, the anamorphic image 318 is properly viewable in 3D by one game participant within the physical gaming suite (e.g., a game participant that is associated with viewpoints 314).

FIG. 3A additionally shows a third anamorphic image 320 that is presented on the bottom surface 304 of the physical gaming suite 300. In some embodiments, the anamorphic image 320 is properly viewable in 3D by at least two game participants within the physical gaming suite (e.g., a first game participant that is associated with viewpoint 310 and a second game participant that is associated with viewpoint 312).

Attention is now directed to FIGS. 3B-3D, which are schematic diagrams showing how the anamorphic images of FIG. 3A appear from different viewpoints within the physical gaming suite, in accordance with some embodiments.

As shown in FIG. 3B, the anamorphic image 318 that is presented within the physical gaming suite is not viewable in 3D by a first game participant that is associated with viewpoint 310. In some embodiments, the viewpoint 310 is excluded from a viewpoint determination (e.g., such as operation 508, FIG. 5A, and/or operation 608, FIG. 6) that is used to generate the anamorphic image 318 (e.g., because the viewpoint 310 is too far away or too different (e.g., an angle of viewing would be too great) from another viewpoint, such as viewpoint 314, and would thus ruin a 3D effect for all game participants). FIG. 3B also shows that the anamorphic images 316 and 320 are viewable in 3D by the first game participant that is associated with viewpoint 310. The 3D effect that is viewable from viewpoint 310, however, may be different from the 3D effect that is viewable by a second game participant that is associated with a different viewpoint (e.g., such as viewpoint 312, in that the 3D effect may appear at a different position or may be slightly distorted).

As shown in FIG. 3C, the anamorphic image 318 that is presented within the physical gaming suite is not viewable in 3D by the second game participant that is associated with viewpoint 312. In some embodiments, the viewpoint 312 is excluded from a viewpoint determination (e.g., such as operation 508, FIG. 5A, and/or operation 608, FIG. 6) that is used to generate the anamorphic image 318 (e.g., because the viewpoint 312 is too far away or too different (e.g., an angle of viewing would be too great) from another viewpoint, such as viewpoint 314, and would thus ruin a 3D effect for all game participants). FIG. 3C also shows that the anamorphic images 316 and 320 are viewable in 3D by the second game participant that is associated with viewpoint 312. The 3D effect that is viewable from viewpoint 312, however, may be different from the 3D effect that is viewable by the first game participant that is associated with a different viewpoint (e.g., such as viewpoint 310, in that the 3D effect may appear at a different position or may be slightly distorted).

As shown in FIG. 3D, the anamorphic image 318 that is presented within the physical gaming suite is viewable in 3D by a third game participant that is associated with viewpoint 314. In some embodiments, the viewpoint 314 is included in a viewpoint determination (e.g., such as operation 508, FIG. 5A, and/or operation 608, FIG. 6) from which viewpoints 310 and 312 were excluded. FIG. 3D also shows that the anamorphic images 316 and 320 are not viewable in 3D by the third game participant that is associated with viewpoint 314. In some embodiments, in accordance with a determination that a particular game participant (e.g., the third game participant) would not be able to view any 33D effects, the system 100 generates and presents a new anamorphic image for viewing by the particular game participant (i.e., to ensure that all game participants are able to experience and view a 3D object during game play within the physical gaming suite).

Attention is now directed to FIGS. 4A-4G, which are schematic diagrams showing example anamorphic images that are projected on one or more surfaces of a physical gaming suite, in accordance with some embodiments. In some embodiments, anamorphic images are presented in 2D on only a bottom surface (e.g., FIGS. 4A-4B), a bottom surface and a back surface (e.g., FIGS. 4C-4E), and only a back surface (e.g., FIGS. 4F-4G).

Figure 4A:
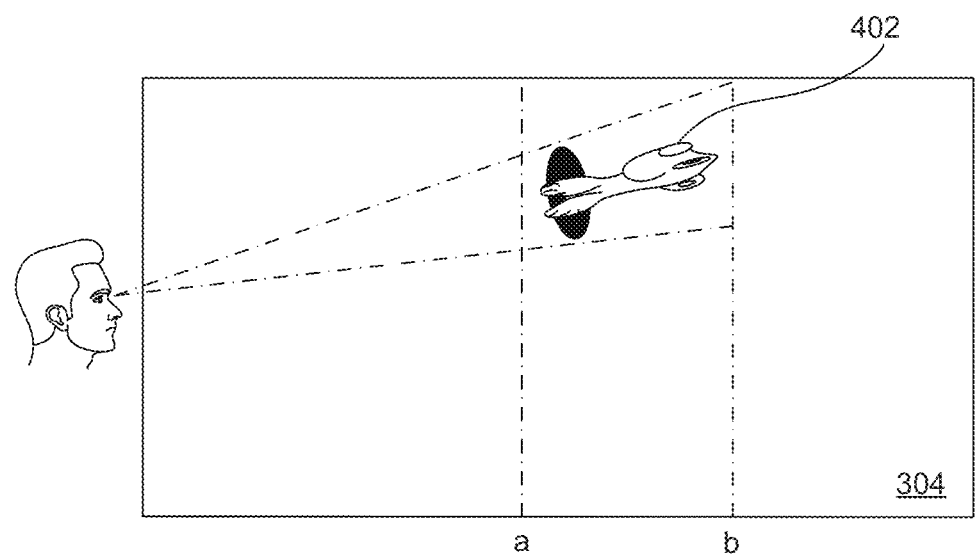
FIGS. 4A-4B are schematic diagrams showing an example anamorphic image that is projected on a bottom surface of a physical gaming suite, in accordance with some embodiments.
Figure 4B:
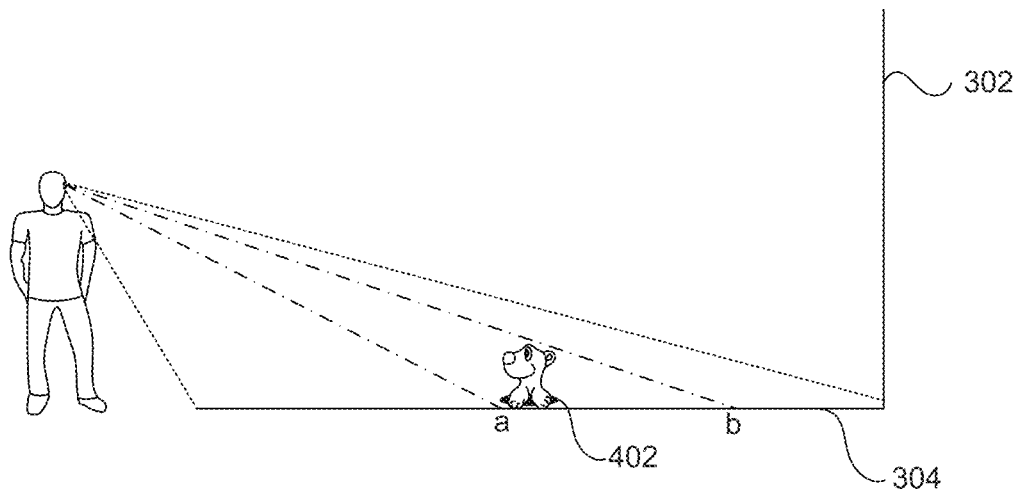

As shown in FIGS. 4A-4B, an anamorphic image 402 of a gopher popping out of a hole can be presented on only a bottom surface of a physical gaming suite and can be presented so that at least one game participant is able to view and appreciate a 3D effect (such as that shown in FIG. 4B). In some embodiments, multiple game participants are able to appreciate and view the 3D effect (e.g., so that the viewpoint/user shown in FIG. 4B is a representation of an average/common/optimal viewpoint for the multiple game participants that are all able to view the 3D effect of the gopher popping out of the hole).

In some embodiments, an intended beginning position for the 3D effect is used (e.g., notated as "a" in FIGS. 4A-4G) in order to determine optimal viewpoints (as explained below in reference to FIG. 6).

Figure 4C:
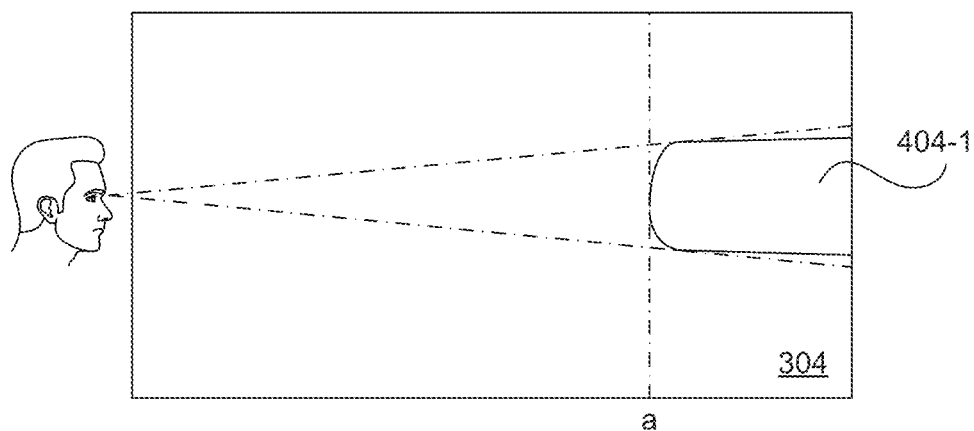
FIGS. 4C-4E are schematic diagrams showing an example anamorphic image that has a first component anamorphic image projected on a bottom surface of a physical gaming suite and a second component anamorphic image projected on back surface of a physical gaming suite, in accordance with some embodiments.
Figure 4D:
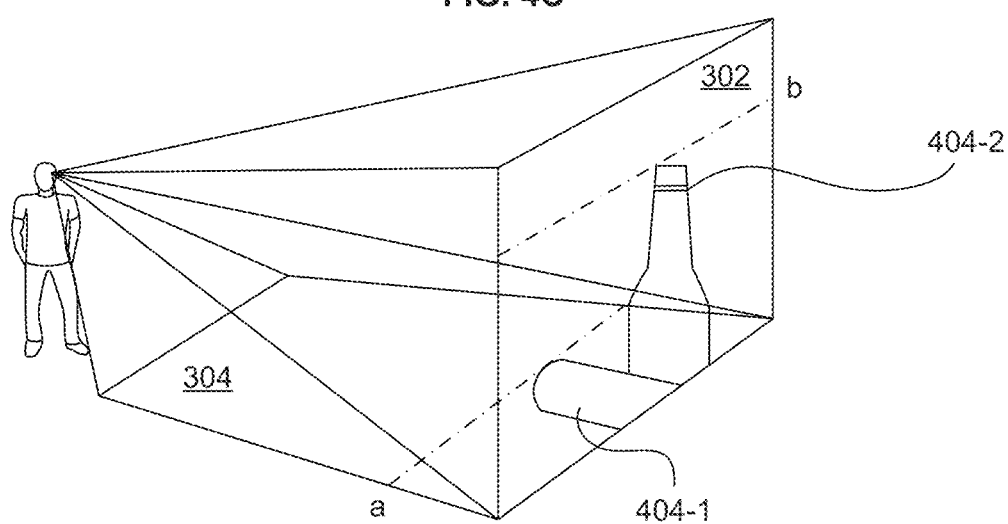
Figure 4E:
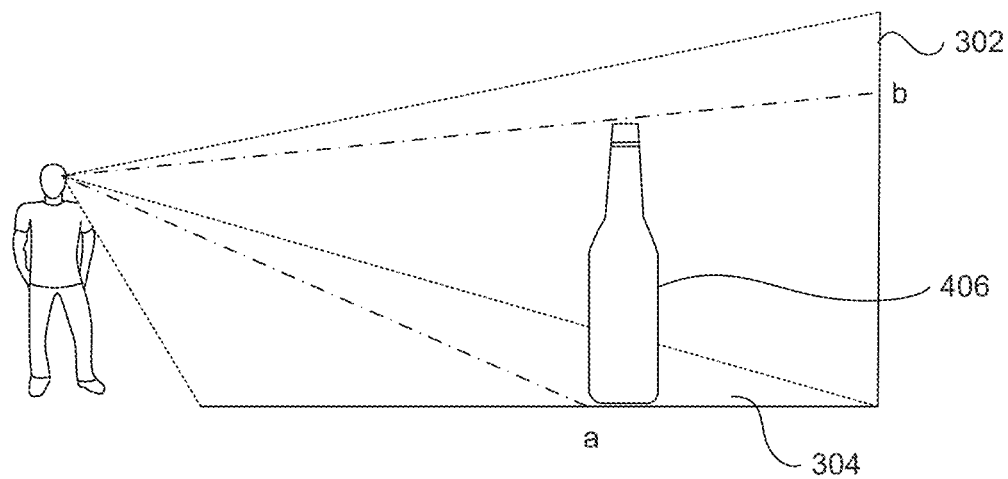

As shown in FIGS. 4C-4E, an anamorphic image 404 of a bottle that is standing up within the physical gaming suite 300 can be presented on both the bottom surface 304 and back surface 302. In some embodiments, a first component 404-1 is presented on the bottom surface 304 (as shown in FIGS. 4C-4D) and a second component 404-2 is presented on the back surface 302 (as shown in FIG. 4D). In some embodiments, multiple game participants are able to appreciate and view the 3D effect (e.g., so that the viewpoint/user shown in FIG. 4E is a representation of an average/common/ optimal viewpoint for the multiple game participants that are all able to view the 3D effect of the bottle standing up within the physical gaming suite 300).

Figure 4F:
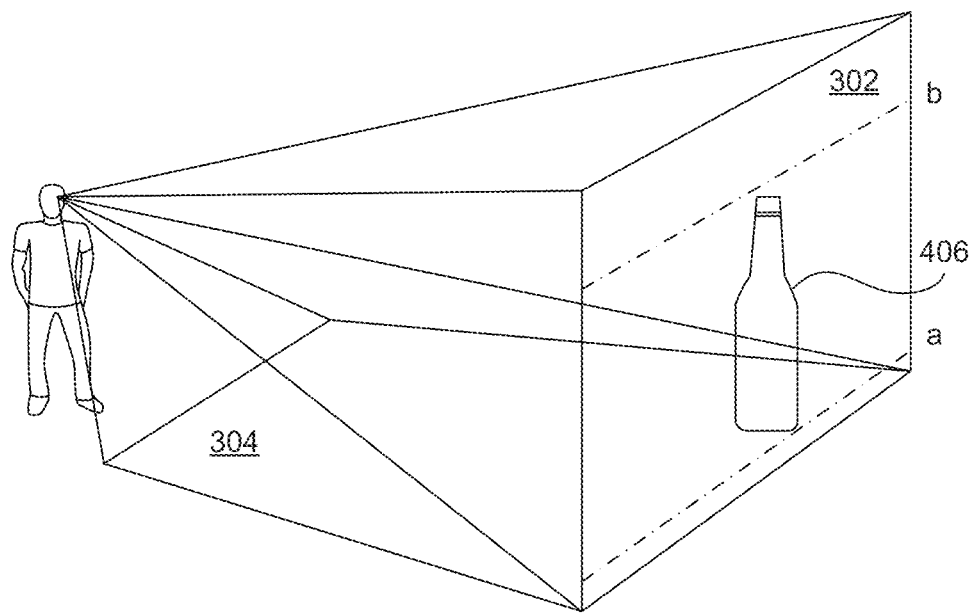
FIGS. 4F-4G are schematic diagrams showing an example anamorphic image that is projected on a back surface of a physical gaming suite, in accordance with some embodiments.
Figure 4G:
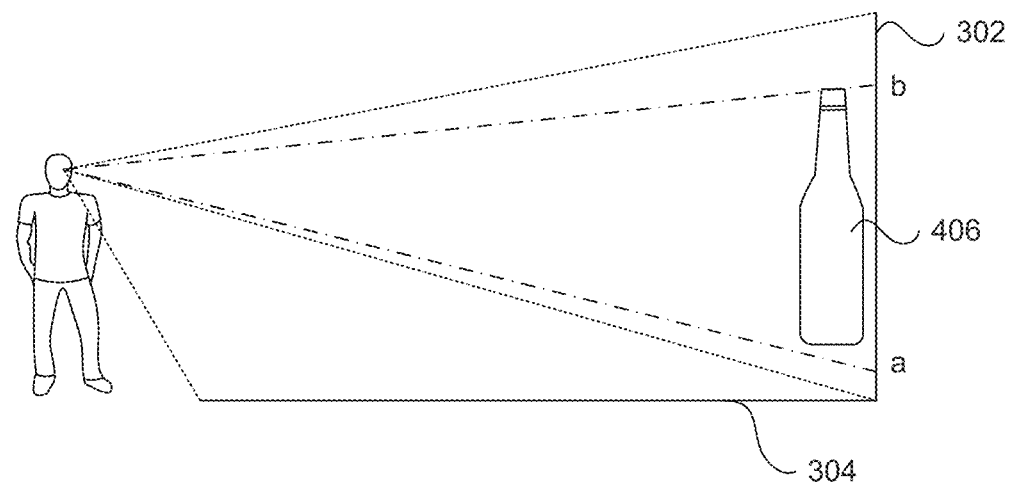

As shown in FIGS. 4F-4G, an anamorphic image 406 of a bottle that is standing up within the physical gaming suite 300 can also be presented on only the back surface 302. In some embodiments, multiple game participants are able to appreciate and view the 3D effect (e.g., so that the viewpoint/user shown in FIG. 4G is a representation of an average/common/optimal viewpoint for the multiple game participants that are all able to view the 3D effect of the bottle standing up within the physical gaming suite 300).

Attention is now directed to FIGS. 5A-5C and FIG. 6, which are flowcharts of methods of programmatically generating anamorphic images for presentation (and 3D viewing) in a physical gaming suite.

Figure 5A:
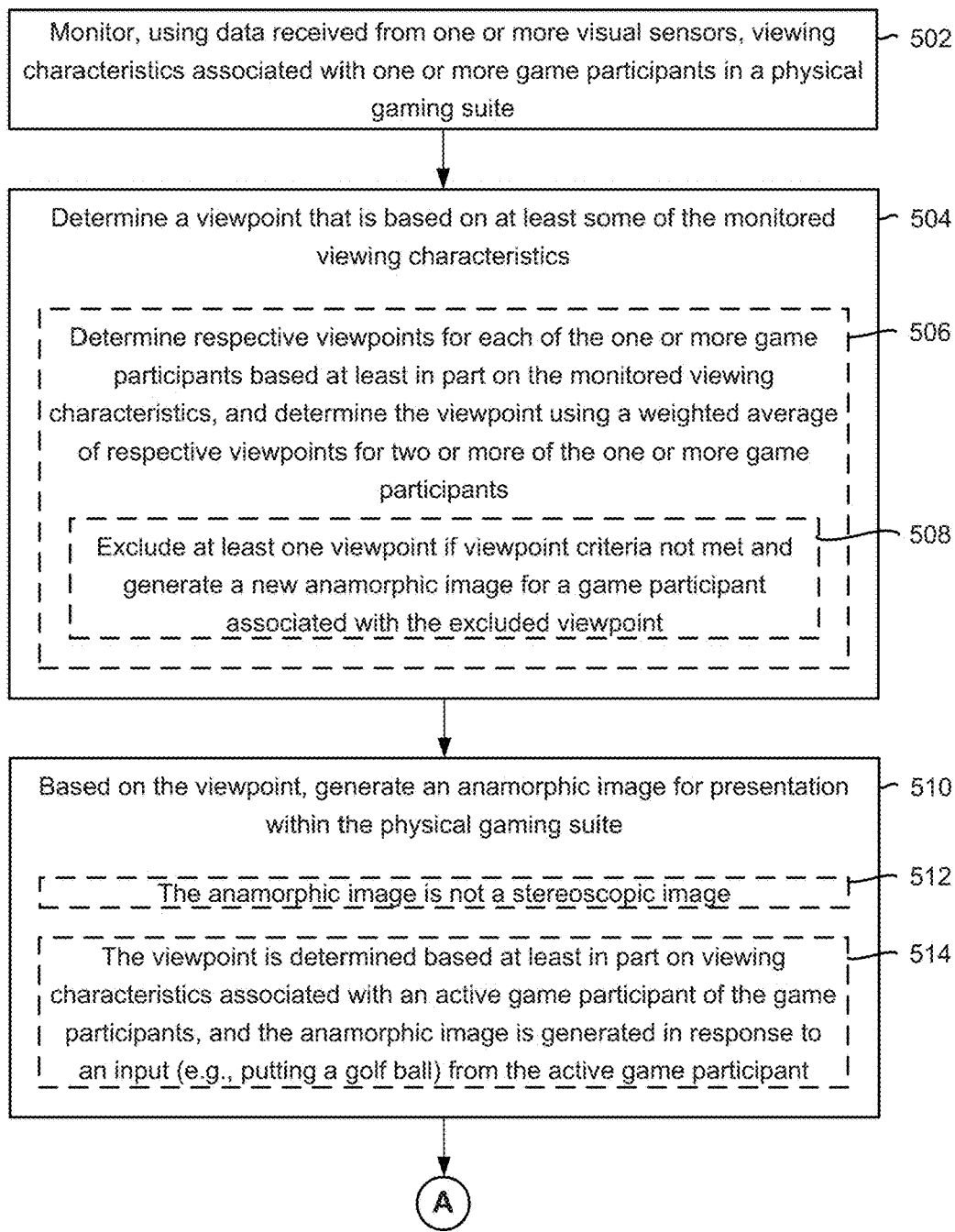
FIGS. 5A-5C are flowcharts of a method of programmatically generating anamorphic images for presentation (and 3D viewing) in a physical gaming suite, in accordance with some embodiments.
Figure 5B:
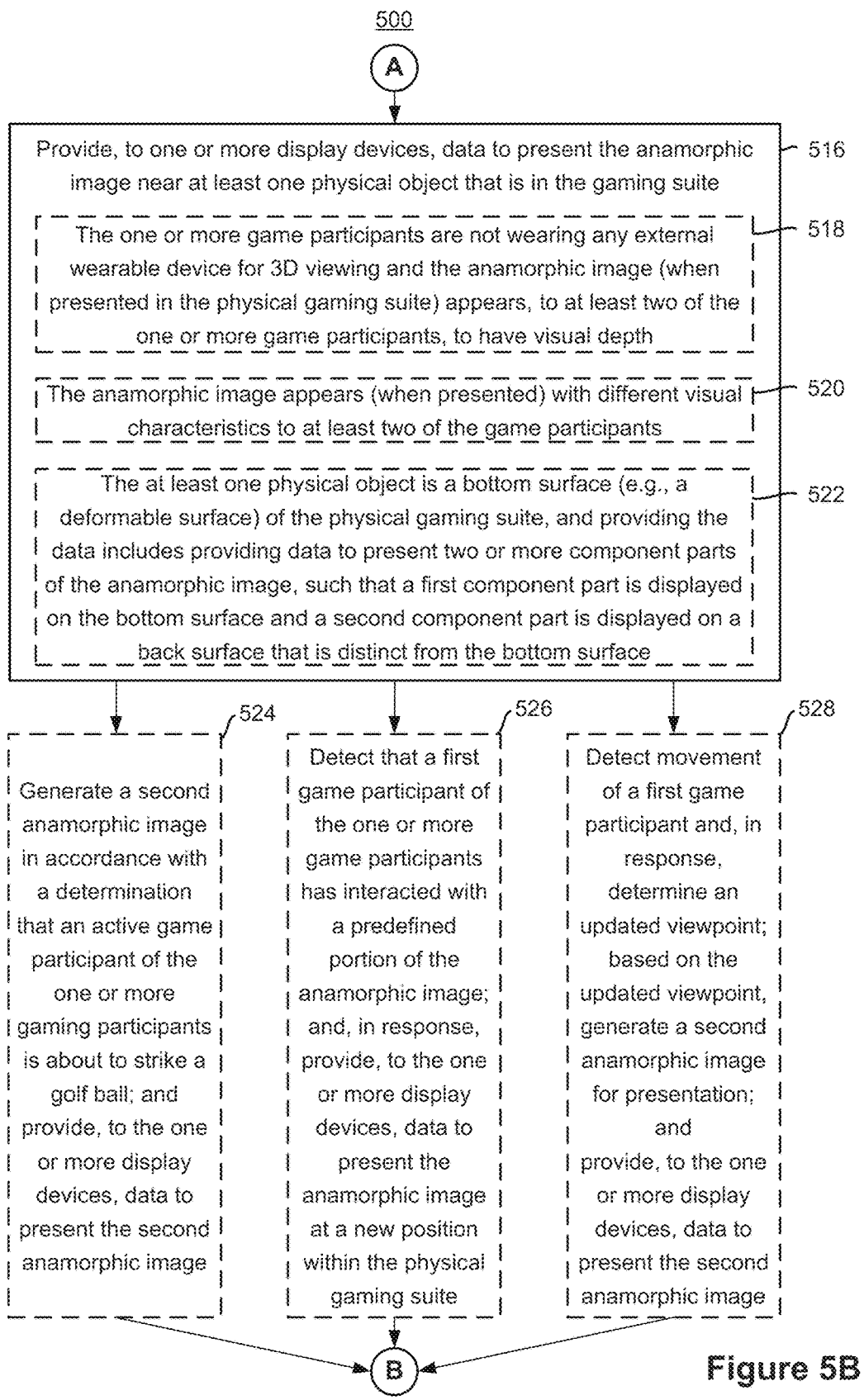
Figure 5C:
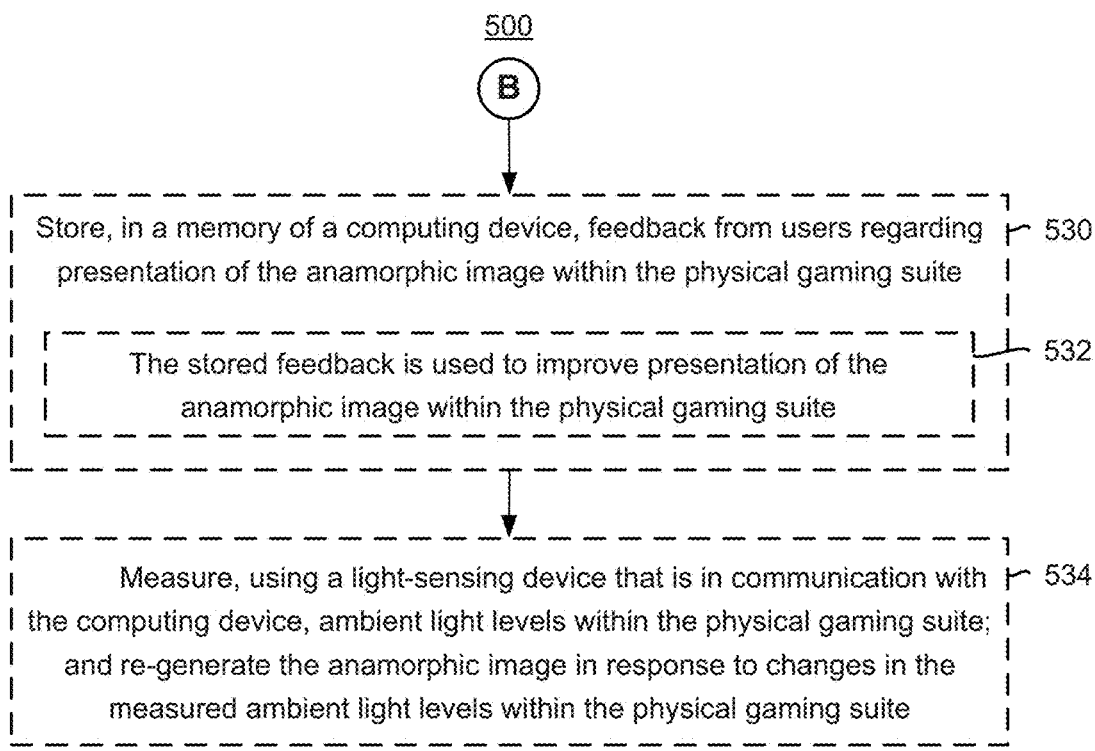

In particular, FIGS. 5A-5C are flowcharts of a method of programmatically generating anamorphic images for presentation (and 3D viewing) in a physical gaming suite, in accordance with some embodiments.

In some embodiments, the method 500 is performed by an electronic device (e.g., system controller 114, FIG. 1A) and/or one or more components of the electronic device (e.g., an I/O subsystem, an operating system, etc.). In some embodiments, the method 500 is governed by instructions that are stored in a non-transitory computer-readable storage medium and that are executed by one or more processors of a device, such as the one or more processors 202-1 of a management module 114-1 (FIG. 1D). For ease of explanation, the following describes method 500 as performed by the system controller 114 (also referred to simply as the device). In some embodiments, with reference to FIG. 1D, the operations of method 500 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), user-specific putting data (e.g., user-specific putting data 218), a leaderboard updating module (e.g., leaderboard updating module 220), a visual characteristics monitoring module (e.g., visual characteristics monitoring module 250), and/or a viewpoint determining module (e.g., viewpoint determining module 252). Some operations in method 500 are, optionally, combined and/or the order of some operations is, optionally, changed.

In some embodiments, the method 500 is performed at a computing device (e.g., system controller 114, FIG. 1A) with one or more processors (e.g., CPUs 202-1, FIG. 1D) and memory (e.g., memory 206, FIG. 1D). The computing device is in communication with one or more visual sensors (e.g., via tracking system interface 204, FIG. 1D, the computing device is able to communicate with one or more cameras 103, FIG. 1A) and one or more display devices (e.g., via tracking system interface 204, FIG. 1D, the computing device is able to communicate with one or more projectors 105, FIG. 1A). In some embodiments, the one or more cameras 103 and the one or more projectors 105 are positioned within a physical gaming suite 300 (FIG. 3A).

The computing device monitors (502), using data received from the one or more visual sensors, viewing characteristics associated with one or more game participants in the physical gaming suite. For example, the viewing characteristics include eye gaze, head position, current standing/sitting positing within the physical gaming suite for each of the one or more game participants. In some embodiments, the viewing characteristics also include a viewing angle for each respective game participant to view an intended position for presenting a digital 3D object (e.g., a 2D image that is projected within the physical gaming suite in such a way so that some of the one or more game participants are able to view a 3D effect for the 2D image that begins at the intended position) within the physical gaming suite. Additional details regarding the intended position are provided below in reference to, e.g., operation 606 of method 600 (FIG. 6).

The method 500 continues with the computing device determining (504) a viewpoint that is based on at least some of the monitored viewing characteristics. In some embodiments, the viewpoint that is determined is a predicted common/optimal viewpoint that represents a common viewpoint for one or more of the game participants at some predetermined interval in the future (e.g., 1, 2, 3, 4, or 5 seconds). In this way, the computing device is able to use the monitored viewing characteristics to predict where game participants will be looking at the predetermined interval in the future and use those predictions to determine a common/optimal viewpoint that is forward-looking (additional details are provided below in reference to method 600, FIG. 6).

In some embodiments, the computing device determines (506) respective viewpoints for each of the one or more game participants based at least in part on the monitored viewing characteristics, and the computing device determines the viewpoint using a weighted average of respective viewpoints for two or more of the one or more game participants. In some embodiments, the weighted average is biased towards a respective game participant that is closest to a position (e.g., the intended position for viewing a digital 3D object, as discussed above) in the physical gaming suite at which the anamorphic image is to be provided.

In some embodiments, all of the monitored viewing characteristics are not used to determine the viewpoint (e.g., only a viewing angle for each game participant is used and other monitored viewing characteristics are not used) or, in other embodiments, some viewing characteristics from only a subset of the game participants are used (e.g., only a viewing angle for a subset of the game participants).

For example, as shown in FIG. 3A, anamorphic image 320 is presented within the physical gaming suite 300 for 3D viewing by both a first game participant associated with viewpoint 310 and a second game participant associated with viewpoint 312. In order to ensure, that both the first and second game participants will be able to view and appreciate a 3D effect for anamorphic image 320, the computing device determines respective viewpoints for the first and second game participants (i.e., using monitored viewing characteristics for each game participant, the computing device determines that viewpoint 310 is associated with the first game participant and that viewpoint 312 is associated with the second game participant) a common/optimal viewpoint that takes into account viewpoint 310 and viewpoint 312.

In some embodiments, the computing device excludes (508) at least one viewpoint for a third game participant from the weighted average, in accordance with a determination that a respective viewpoint for the third game participant does not meet predefined viewpoint criteria (e.g., including a criterion for distance away from a respective anamorphic image, a criterion for viewing angle of a respective anamorphic image, and other criterion that affect a game participant's ability to appreciate a 3D effect for a respective anamorphic image). For example, continuing the above example in reference to FIG. 3A, viewpoint 314 for the third game participant is excluded in accordance with a determination that a viewing angle from viewpoint 314 to the position at which anamorphic image 320 is presented is too great.

The computing device generates (510), based on the viewpoint determined in operation 504, an anamorphic image (e.g., anamorphic image 320, FIG. 3A) for presentation within the physical gaming suite. In some embodiments, the anamorphic image is not a stereoscopic image (512) and, thus, users need not wear any external wearable device (e.g., glasses) to view anamorphic image 320 in 3D (e.g., as shown in FIGS. 3B-3C). In some embodiments, the viewpoint is determined (514) based at least in part on viewing characteristics associated with an active game participant (e.g., the first game participant associated with viewpoint 310 is currently putting), and the anamorphic image is generated in respective to an input (e.g., the first game participant striking a golf ball with a putting motion) from the active game participant. For example, anamorphic image 320 is generated so that it appears near the golf ball as the golf ball travels towards a target (e.g., flames that appear to follow the golf ball as it rolls).

In some embodiments, generating the anamorphic image includes selecting the anamorphic image based on a current number of game participants that will be viewing the anamorphic image, so that an appropriate image is selected so that most of the users will appreciate and enjoy the 3D effect (e.g., a larger image is selected and is placed closer to a back surface of the physical gaming suite, if more game participants are to view the image in 3D).

The computing device also provides (516), to the one or more display devices, data to present the anamorphic within the physical gaming suite (e.g., the anamorphic image is presented near (e.g., over, on, or on top of) at least one physical object that is in the physical gaming suite). In some embodiments, the at least one physical object is a surface within the physical gaming suite (e.g., bottom surface 304 and/or back surface 302, FIG. 3A) or some other object within the suite, such as a chair, a hula hoop, or a golf club. In some embodiments, the data includes information identifying the intended position for viewing of the anamorphic image in 3D (as discussed above) and includes information identifying an anamorphic effect/technique to apply to the anamorphic image (e.g., to further stretch a stored image, change a brightness of the stored image, and other manipulations to improve how the game participants are able to perceive the anamorphic image in 3D).

In some embodiments, the bottom surface 304 is substantially perpendicular to the back surface 302. For example, the bottom surface 304 is a playing surface (e.g., playing surface 104, FIGS. 1A-1B) on which a game is played by game participants (e.g., a putting game).

In some embodiments, monitoring the viewing characteristics (e.g., operation 502) includes monitoring viewing characteristics for at least two game participants, determining the viewpoint (e.g., operation 504) includes determining the viewpoint based on at least some of the monitored viewing characteristics for the at least two game participants, and providing the data to present the anamorphic image (e.g., operation 516) includes providing data to present the anamorphic image for 3D viewing by the at least two game participants. In other words, the anamorphic image is generated and specifically tailored for 3D viewing by a subset of the game participants, so that each of them is able to appreciate and view a 3D effect for a respective anamorphic image (that is projected within the physical gaming suite) simultaneously.

In some embodiments, providing the data to present the anamorphic image includes providing a first portion of the data to a first display device (e.g., a first projector 105 positioned at a first location within the physical gaming suite 300) and providing a second portion of the data to a second display device (e.g., a second projector 105 positioned at a second location within the physical gaming suite 300) that is distinct from the first display device. In some embodiments, the first portion corresponds to data used to render the anamorphic image and the second portion corresponds to data used to render a shadow effect proximate to the anamorphic image. Stated another way, the shadow effect is used to enhance, improve, and sharpen the 3D effect produced by the display of the anamorphic image.

In some embodiments, the one or more game participants are not wearing any external wearable device for 3D viewing (518) and the anamorphic image (when presented in the physical gaming suite) appears, to at least two of the one or more game participants, to have visual depth (i.e., the at least two game participants are able to perceive the anamorphic image in 3D, e.g., as shown in FIGS. 3B-3C for anamorphic image 320 as viewed from viewpoints 310 and 312).

In some embodiments, the anamorphic image appears (when presented within the physical gaming suite) with different visual characteristics to at least two of the game participants (520). For example, each game participant's perception of the 3D effect is slightly different, so that a first game participant sees slight distortions in order to ensure that other game participants also appreciate the 3D even if each participant views the 3D effect with some slight distortions. In some embodiments, the at least two game participants view a respective anamorphic image in 3D at slightly different positions within the physical gaming suite (as shown for anamorphic image 320, FIGS. 3B-3C, with respect to viewpoints 310 and 312).

In some embodiments, the at least one physical object is a bottom surface (e.g., a deformable or tilt-able surface, such as those shown in FIGS. 2A-2C) of the physical gaming suite (522), and providing the data includes providing data to present two or more component parts of the anamorphic image, such that a first component part is displayed on the bottom surface (e.g., first component part 316-1 of anamorphic image 316, FIG. 3A, is displayed on the back surface 302) and a second component part is displayed on a back surface that is distinct from the bottom surface (e.g., second component part 316-2 of anamorphic image 316, FIG. 3A, is displayed on the bottom surface 304). Stated another way, the anamorphic image is generated in such a way so that it will be stitched together by human eyesight (e.g., those viewing the anamorphic image from the respective viewpoints determined above) to produce a viable 3D effect for most of the game participants.

In some embodiments, generating the anamorphic image includes generating the anamorphic image based at least in part on both the viewpoint and based on a current topography of the bottom surface. In some embodiments, at least three distinct inputs are utilized in order to generate the anamorphic image, including (i) a common viewpoint that represents a viewpoint that allows two or more game participants to view a 3D effect for the anamorphic image; (ii) a current topography of the bottom surface; and (iii) an intended viewing position for the 3D effect for the anamorphic image (e.g., a starting position within the physical gaming suite at which the 3D effect is intended to begin). Other inputs may also be utilized, including measured levels of ambient light (e.g., operations 530-534 below), gaming events (game participants moving around, striking golf balls, and the like, as discussed herein), and desired shadowing effects (e.g., additional shadow to add to the anamorphic image in order to improve perception of the 3D effect). Additional details regarding these inputs are provided throughout this description.

In some embodiments, the computing device is also configured to generate and provide data to present multiple anamorphic images within the physical gaming suite 300. As a few non-limiting examples: (i) a new anamorphic image can be generated for a game participant that was excluded from viewing the anamorphic image 320 (as discussed as an example above); (ii) a new anamorphic image can be generated to distract a player during game play; (iii) a new anamorphic image can be generated in response to interactions with the anamorphic image while it is display in the physical gaming suite; and (iv) a new anamorphic image can be presented in response to movement of a game participant.

More specifically, as to (i), in accordance with the determination that the respective viewpoint for the first game participant does not meet predefined viewpoint criteria (e.g., operation 508), the computing device determines a second viewpoint for at least the first game participant (e.g., the game participant whose viewpoint was excluded in conjunction with operation 508) and generate a second anamorphic image based on the second viewpoint (e.g., anamorphic image 318, FIG. 3A, for viewing by a game participant associated with viewpoint 314); and the computing device provides, to the one or more display devices, data to present the second anamorphic image within the physical gaming suite (e.g., so that a 3D effect is viewable from at least the second viewpoint, as shown in FIG. 3D for anamorphic image 318 as seen from viewpoint 314).

As to (ii), in some embodiments, the computing device generates (524) a second anamorphic image in accordance with a determination that an active game participant (e.g., game participant associated with viewpoint 310, FIG. 3A) of the one or more gaming participants is about to strike a golf ball; and the computing device provides, to the one or more display devices, data to present the second anamorphic image. For example, the second anamorphic image is a distraction such as a gopher and the second anamorphic image that is presented before the active game participant strikes the golf ball (such as anamorphic image 402 as shown in FIGS. 4A-4B).

As to (iii), in some embodiments, the computing device detects (526) that a first game participant of the one or more game participants has interacted with a predefined portion of the anamorphic image (e.g., the anamorphic image is a beach ball that the user can push around the physical gaming suite). In response to detecting that the first game participant has interacted with the predefined portion of the anamorphic image, the computing device provides, to the one or more display devices, data to present the anamorphic image at a new position within the physical gaming suite that is distinct from a first position at which the anamorphic image was presented during the first game participant's detected interactions.

As to (iv), in some embodiments, the computing device detects (528), using the one or more visual sensors, movement (e.g., the detected movement corresponds to a change in one or more of the viewing characteristics) of a first game participant of the one or more game participants within the physical gaming suite. In response to detecting the movement, the computing device determines an updated viewpoint (e.g., by selecting respective viewpoints for one or more game participants who will view a 3D effect for a second anamorphic image). Based on the updated viewpoint, the computing device generates a second anamorphic image for presentation within the physical gaming suite; and provides, to the one or more display devices, data to present the second anamorphic image near (or over, on, or on top of) at least one physical object (e.g., one or more surfaces within the physical gaming suite, such as a bottom surface and a back surface perpendicular to the bottom surface, a chair, a hula hoop, or any other object or surface within the suite) that is included within the gaming suite.

In some embodiments, the computing device performs one or more of example operations (i), (ii), (iii), and (iv) in sequence or in parallel, in order to generate and present multiple anamorphic images within the physical gaming suite 300 simultaneously (e.g., as shown in FIGS. 3A-3D, three different anamorphic images are presented within the physical gaming suite 300 at once).

In some embodiments, the computing device stores (530), in the memory of the computing device, feedback from users regarding presentation of the anamorphic image within the physical gaming suite. For example, the feedback includes both quantitative (such as mood sensing feedback, whether users are looking at the displayed anamorphic image, how long a user remains focused on a displayed anamorphic image, and the like) and qualitative feedback (e.g., verbal reactions detected and stored by one or more microphones positioned within the physical gaming suite 300, input from a caddy, input from an engineer, and the like).

In some embodiments, the stored feedback is used to improve (532) presentation of the anamorphic image within the physical gaming suite (i.e., the anamorphic image is re-generated and re-presented within the physical gaming suite 300 in accordance with a determination that presentation of the anamorphic image can be improved based on the stored feedback, and/or the stored feedback is used to improve future generations and presentations of the anamorphic image).

In some embodiments, the computing device measures (534), using a light-sensing device that is in communication with the computing device, ambient light levels within the physical gaming suite; and re-generates the anamorphic image in response to changes in the measured ambient light levels within the physical gaming suite (or in accordance with a determination that the changes in the measured ambient light levels will affect presentation and ability to perceive a 3D effect for the anamorphic image).

Additional operations of method 500 may be interchanged or added to include operations discussed below with respect to FIG. 6. For example, the method 500 may include one or more operations of method 600, such as operation 606 in which an intended position for viewing a 3D object is also used to help determine how to generate and present an anamorphic object for 3D viewing.

It should be understood that the particular order in which the operations of method 500 have been described is merely exemplary and is not intended to indicate that the described order is the only order in which the operations could be performed. One of ordinary skill in the art would recognize various ways to reorder the operations described herein.

Figure 6:
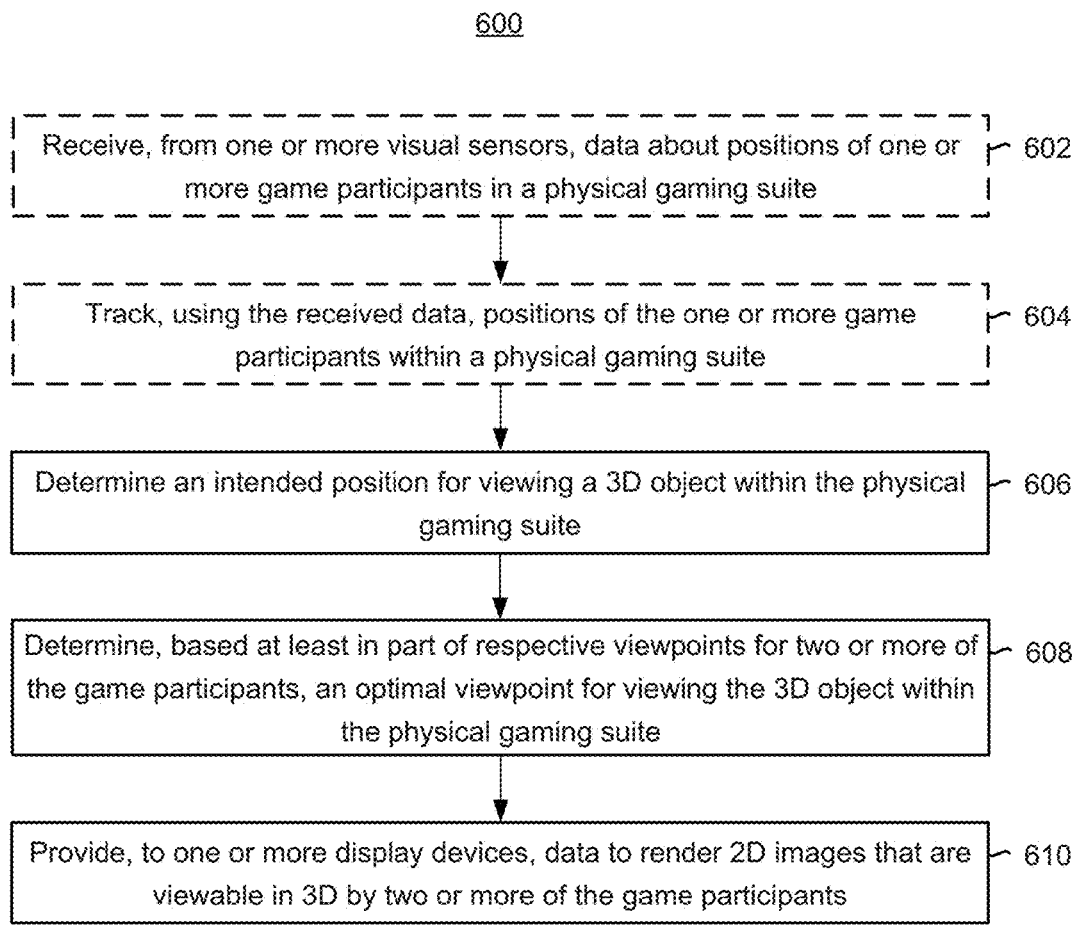
FIG. 6 is a flowchart of a method of programmatically generating anamorphic images for presentation (and 3D viewing) in a physical gaming suite, in accordance with some embodiments.

FIG. 6 is a flowchart of a method of programmatically generating anamorphic images for presentation (and 3D viewing) in a physical gaming suite, in accordance with some embodiments.

In some embodiments, the method 600 is performed by an electronic/computing device (e.g., system controller 114, FIG. 1A) and/or one or more components of the electronic device (e.g., an I/O subsystem, an operating system, etc.). In some embodiments, the method 600 is governed by instructions that are stored in a non-transitory computer-readable storage medium and that are executed by one or more processors of a device, such as the one or more processors 202-1 of a management module 114-1 (FIG. 1D). For ease of explanation, the following describes method 600 as performed by the system controller 114 (also referred to simply as the device). In some embodiments, with reference to FIG. 1D, the operations of method 600 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), user-specific putting data (e.g., user-specific putting data 218), a leaderboard updating module (e.g., leaderboard updating module 220), a visual characteristics monitoring module (e.g., visual characteristics monitoring module 250), and/or a viewpoint determining module (e.g., viewpoint determining module 252). Some operations in method 600 are, optionally, combined and/or the order of some operations is, optionally, changed.

In some embodiments, a method 600 optionally includes: receiving (602), from one or more visual sensors (e.g., one or more cameras 103, FIGS. 1A-1B, that are positioned within a physical gaming suite 300 of a sport simulation system 100), data about positions of one or more game participants in the physical gaming suite. The method optionally also includes tracking (604), using the received data positions of the one or more game participants within the physical gaming suite. In some embodiments, the game participants are tracked in real-time as they stand, sit, or move within the physical gaming suite. In some embodiments, a combination image data, 3D triangulation techniques and active sensors (e.g. Kinect) are all used to provide raw data as inputs. In some embodiments, the raw data drives a state estimation engine capable of accurately localizing each player and predicting player motion several seconds into the future with a high degree of confidence.

In some embodiments, the method includes determining (606) an intended position for viewing a 3D object within the physical gaming suite. For example, a beginning point is determined (such as beginning point "a" shown in FIGS. 4A-4G for a variety of example anamorphic images that are projected in 2D and viewable in 3D) at which the 3D object begins.

The method further includes: determining (608), based at least in part of respective viewpoints for two or more of the game participants, an optimal viewpoint for viewing the 3D object within the physical gaming suite (e.g., a common viewpoint at which two or more of the game participants will be able to appreciate and view the 3D effect). In some embodiments, the computing device will a number of inputs while determining the optimal viewpoint, including: (1) the position of each player as determined above (e.g., in operations 602-604) and (2) the intended location on the playing surface of the 3D object to be displayed (e.g., operation 606). The computing device then determines a subset of the most self-consistent viewpoints. Game participants whose viewpoints are not within this inlier set will not be considered when computing/generating an anamorphic image for view-dependent 3D viewing within the physical gaming suite. If no two views are sufficiently consistent to produce a common 3D viewpoint, the system will select a current active player and generate the 3D object from the viewpoint of that player.

In some embodiments, selection of the subset of players to be included in determining a common 3D viewpoint will be based on minimizing the relative angles between the target 3D object (e.g., the 3D object that is viewable after rendering a 2D anamorphic image) and any two players within the inlier subset. From this, the computing device determines the optimal viewpoint by selecting a point in space that minimizes the angle with respect to the 3D object of any player in the inlier set with the optimal viewpoint. In some embodiments, a quadratic least squares model is used.

The method additionally includes: providing (610), to one or more display devices (e.g., one or more projectors 105 positioned within the physical gaming suite, data to render 2D images (e.g., anamorphic images, such as the examples shown in FIGS. 3A-3D and 4A-4G) that are viewable in 3D by two or more of the game participants. In some embodiments, once a common viewpoint is determined (e.g., operation 608), the computing device generates a virtual camera at the location of the common viewpoint and a virtual illumination source at some overhead location coincident with the room lighting. In some embodiments, a virtual light source and model of the 3D object will be used to generate a mathematical model of shadows on the playing surface. In some embodiments, the 3D object and associated shadows will be projected mathematically into the virtual camera view. The resulting 2D image representation of the 3D virtual object and shadow will then be mapped mathematically onto the flat (or actuated) surface of the green by ray casting from the virtual camera. The resulting mapping will be communicated to the projection system and displayed directly on the green. The effect will be a perfectly rendered 2D projection of a 3D object with shadowing as seen from the optimal viewpoint. This virtual 3D object will become more distorted as the viewpoint moves away from the optimal viewing location.

In some embodiments, positions of each game participant are tracked in near real-time as described above. As play progresses, the computing device in some embodiments predicts optimal viewpoints for 3D rendering as described above based on the predicted locations of players. This reduces computational lag in both viewpoint determination and 3D rendering as the most likely optimal viewpoint several seconds into the future can be pre-computed and the associated 3D object pre-rendered.

Additional operations of method 600 may be interchanged or added to include operations discussed above with respect to FIGS. 5A-5C (e.g., to generate second anamorphic images, re-generated anamorphic images based on changes in ambient light, and/or to modify presentation of an anamorphic object based on changes in a topography of a surface on which an anamorphic image is presented).

While golf is used as an example above to explain to help explain various aspects of some embodiments described herein, it should be appreciated that the systems and techniques disclosed herein can be used and/or adapted for any other sport or game VR experience. For example, the VR system can be used for playing other sports or games (e.g., snowboarding, skiing, surfing, laser tag, first-person shooters, or other similar games). In some embodiments, a snowboarder rides on a high speed rotating and deformable surface that replicates a downhill run and the related surface contour. In some embodiments, a mechanical system provides the snowboarder an immersive experience supported and enhanced by the 3D effects and other environmental simulation techniques described herein in order to provide a fully immersive VR experience. In some embodiments, projectors present images to place the snowboarder on any slope over the world and the images are projected onto the walls and the ceiling of the physical gaming or entertainment suite 300. In some embodiments, the audio systems replicate sounds of rushing down the hill, wind in the trees, and/or crowd cheering as the snowboarder enter a finish line. In some embodiments, a simulated environment with cold, fog, moisture, and wind as the snowboarder speeds down the hill is provided using the techniques discussed above (e.g., via the environmental simulation devices 192, FIG. 1C).

In some embodiments, an immersive VR experience includes 2D images (e.g., one or more anamorphic images) presented for 3D viewing is provided for surfing. In some embodiments, the surfing simulator simulates surfing on a wave generator. In some embodiments, the projectors present views to immerse the surfer in an environment of any beach around the globe. In some embodiments, the audio system replicates an aural environment including the seagulls and the crowd cheering when the wave is taken all the way in, or when the surfer is found in a tube. In some embodiments, the environmental simulation devices 192 (FIG. 1C) replicate the heat and humidity for any beach location from Hawaii to California. In some embodiments, the projectors updates the views rapidly based upon the surfer's head and eye location using the high speed cameras and constantly adjusts the views for the associated viewpoint (to produce constantly changing and adapting 3D effects that move based on the surfer's current position).

In some embodiments, the 3D effects described herein are used to study history or take a tour in any city in the world from any time period. For example, the system is used for simulating a tourist walking through the streets of Paris in the 1800s. In some embodiments, the walk is simulated with a mechanical system that rotates and simulates motion forward. In some embodiments, the deformable surfaces of the physical gaming suite 300 change to cobblestone. In some embodiments, the audio systems simulate sounds around the user of the environment they are immersed into. In some embodiments, the environmental simulation devices 192 (FIG. 1C) simulate the external environment and temperature to be of any location transported to in the world. In some embodiments, the projectors update the views rapidly based upon the tourist's head and eye location using the high speed cameras and constantly adjust the views for the associated viewpoint of either one tourist or up to four tourists (e.g., by presenting 2D images that are viewable in 3D by presenting the 2D images at an optimal viewpoint, as described above).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of programmatically generating a non-stereoscopic image for presentation in a physical gaming suite, the method comprising:
at a computing device with one or more processors and memory, wherein the computing device is in communication with one or more sensors and one or more display devices:
monitoring, using data received from the one or more sensors, viewing characteristics that influence respective perspectives at which an image is viewed by each of one or more game participants in the physical gaming suite;
determining a viewpoint that is based on at least some of the monitored viewing characteristics;
based on the viewpoint, generating the image for presentation within the physical gaming suite; and
providing, to the one or more display devices, data to present the image within the physical gaming suite;
wherein the image is not a stereoscopic image.

2. The method of claim 1, wherein:
the one or more game participants are not wearing any external wearable device, and
the image appears, to at least two of the one or more game participants without requiring use of any external wearable device, to have visual depth.

3. The method of claim 1, wherein providing the data to present the image includes providing a first portion of the data to a first display device and providing a second portion of the data to a second display device that is distinct from the first display device.

4. The method of claim 3, wherein
the first portion corresponds to data used to render the image for display within the physical gaming suite by the first display device and
the second portion corresponds to data used to render a shadow effect proximate to the image within the physical gaming suite by the second display device.

5. The method of claim 1, further comprising:
detecting, using the one or more sensors, movement of a first game participant of the one or more game participants within the physical gaming suite;
in response to detecting the movement, determining an updated viewpoint;
based on the updated viewpoint, generating an additional image for presentation within the physical gaming suite; and
providing, to the one or more display devices, data to present the additional image near at least one physical object that is included within the gaming suite.

6. The method of claim 1, wherein the image appears with different visual characteristics to at least two of the game participants.

7. The method of claim 1, wherein the viewpoint is determined based at least in part on viewing characteristics associated with an active game participant of the one or more game participants, and the image is generated in response to an input from the active game participant.

8. The method of claim 7, wherein the input corresponds to the active game participant striking a golf ball.

9. The method of claim 8, wherein:
providing the data to present the image includes providing data to present the image near at least one physical object that is included in the physical gaming suite, and
the at least one physical object is the golf ball.

10. The method of claim 1, further comprising:
generating an additional image in accordance with a determination that an active game participant of the one or more game participants is about to strike a golf ball; and
providing, to the one or more display devices, data to present the additional image.

11. The method of claim 1, further comprising:
detecting that a first game participant of the one or more game participants has interacted with a predefined portion of the image;
in response to detecting that the first game participant has interacted with the predefined portion of the image, providing, to the one or more display devices, data to present the image at a new position within the physical gaming suite that is distinct from a first position at which the image was presented during the first game participant's detected interactions.

12. The method of claim 1, wherein:
providing the data to present the image includes providing data to present the image near at least one physical object that is included in the physical gaming suite,
the at least one physical object is a bottom surface of the physical gaming suite, and
providing the data includes providing data to present two or more component parts of the image, such that a first component part is displayed on the bottom surface and a second component part is displayed on a back surface of the physical gamine quite that is distinct from the bottom surface.

13. The method of claim 12, wherein:
the bottom surface of the physical gaming suite is a deformable surface, and
generating the image includes generating the image based at least in part on both the viewpoint and based on a current topography of the bottom surface.

14. The method of claim 1, wherein determining the viewpoint includes:
determining respective viewpoints for each of the one or more game participants based at least in part on the monitored viewing characteristics, and
determining the viewpoint using a weighted average of respective viewpoints for two or more of the one or more game participants.

15. The method of claim 14, wherein the weighted average is biased towards a respective game participant that is closest to a position in the physical gaming suite at which the image is to be provided.

16. The method of claim 14, further comprising:
in accordance with a determination that a respective viewpoint for a first game participant does not meet predefined viewpoint criteria, excluding the respective viewpoint from the weighted average of respective viewpoints.

17. The method of claim 16, further comprising:
in accordance with the determination that the respective viewpoint for the first game participant does not meet the predefined viewpoint criteria, determining a second viewpoint for at least the first game participant and generate an additional image based on the second viewpoint; and
providing, to the one or more display devices, data to present the additional image within the physical gaming suite.

18. The method of claim 1, further comprising:
measuring, using a light-sensing device that is in communication with the computing device, ambient light levels within the physical gaming suite; and
re-generating the image in response to changes in the measured ambient light levels within the physical gaming suite.

19. A system for programmatically generating a non-stereoscopic image for presentation in a physical gaming suite, the system comprising:
one or more display devices configured to present images within the physical gaming suite based on data received from a computing device;
one or more sensors configured to monitor viewing characteristics that influence respective perspectives at which an image is viewed by each of one or more game participants in the physical gaming suite;
the computing device with one or more processors and memory, wherein:
the computing device is in communication with the one or more sensors and the one or more display devices, and
the memory of the computing device stores one or more programs that, when executed by the one or more processors of the computing device, cause the computing device to:
monitor, using data received from the one or more sensors, viewing characteristics associated with one or more game participants in the physical gaming suite;
determine a viewpoint that is based on at least some of the monitored viewing characteristics;
based on the viewpoint, generate the image for presentation within the physical gaming suite; and
provide, to the one or more display devices, data to present the image within the physical gaming suite;
wherein the image is not a stereoscopic image.

20. A non-transitory computer-readable storage medium storing one or more programs for programmatically generating a non-stereoscopic image for presentation in a physical gaming suite that, when executed by a computing device that is in communication with one or more sensors and one or more display devices, the computing device including one or more processors and memory, cause the computing device to:
monitor, using data received from the one or more sensors that are in communication with the computing device, viewing characteristics that influence respective perspectives at which an image is viewed by each of one or more game participants in the physical gaming suite;
determine a viewpoint that is based on at least some of the monitored viewing characteristics;
based on the viewpoint, generate the image for presentation within the physical gaming suite; and
provide, to one or more display devices that are in communication with the computing device, data to present the image within the physical gaming suite;
wherein the image is not a stereoscopic image.

* * * * *

UNITED STATES PATENT AND TRADEMARK OFFICE
CERTIFICATE OF CORRECTION

PATENT NO. : 10,293,257 B2  
APPLICATION NO. : 15/807449  
DATED : May 21, 2019  
INVENTOR(S) : Gupta et al.

Page 1 of 1

It is certified that error appears in the above-identified patent and that said Letters Patent is hereby corrected as shown below:

On the Title Page

(57) ABSTRACT, Line 11, please delete "generating a anamorphic" and insert --generating the anamorphic--;

(57) ABSTRACT, Line 13, please delete "additional includes" and insert --additionally includes--;

In the Claims

Claim 12, Column 37, Line 22, please delete "physical gamine quite that" and insert --physical gaming suite that--.

Signed and Sealed this  
Sixth Day of August, 2019

Andrei Iancu  
*Director of the United States Patent and Trademark Office*